United States Patent [19]
Blaschke

[11] 3,824,437
[45] July 16, 1974

[54] METHOD FOR CONTROLLING ASYNCHRONOUS MACHINES

[75] Inventor: Felix Blaschke, Erlangen, Germany

[73] Assignee: Siemens Aktiengesellschaft, Berlin and Munich, Germany

[22] Filed: Mar. 23, 1972

[21] Appl. No.: 237,572

Related U.S. Application Data

[63] Continuation of Ser. No. 63,073, Aug. 12, 1970, abandoned.

[30] Foreign Application Priority Data

Aug. 14, 1969 Germany............................ 1941312
Apr. 22, 1970 Germany............................ 2019263

[52] U.S. Cl.................. 318/227, 318/230, 318/231
[51] Int. Cl. ............................................. H02p 5/40
[58] Field of Search..................... 318/227, 230, 231

[56] References Cited
UNITED STATES PATENTS

| | | | |
|---|---|---|---|
| 3,500,158 | 3/1970 | Landau et al...................... | 318/227 |
| 3,512,067 | 5/1970 | Landau.............................. | 318/227 |
| 3,568,022 | 3/1971 | Domann et al..................... | 318/227 |
| 3,612,971 | 10/1971 | Blaschke et al..................... | 318/227 |
| 3,678,355 | 7/1972 | Bucek et al......................... | 318/227 |

*Primary Examiner*—Gene Z. Rubinson
*Attorney, Agent, or Firm*—Herbert L. Lerner

[57] ABSTRACT

A component converter has two adding amplifiers each having two inputs and four multipliers each having two inputs and an output. Each output of the multipliers is connected to a corresponding input of the amplifiers. A first input terminal is connected to an input of each of two of the multipliers and applies a stator related field component voltage cos $\phi$ thereto. A second input terminal is connected to an input of each of the other two of the multipliers and applies a stator related field component voltage sin $\phi$ thereto. A third input terminal is connected to the other input of each of two of the multipliers and applies a field axis related voltage b or a stator related component voltage $I_r$ thereto. A fourth input terminal is connected to the other input of each of the other two of the multipliers and applies a field axis related voltage $w$ or a stator related component voltage $I_j$ thereto.

25 Claims, 22 Drawing Figures

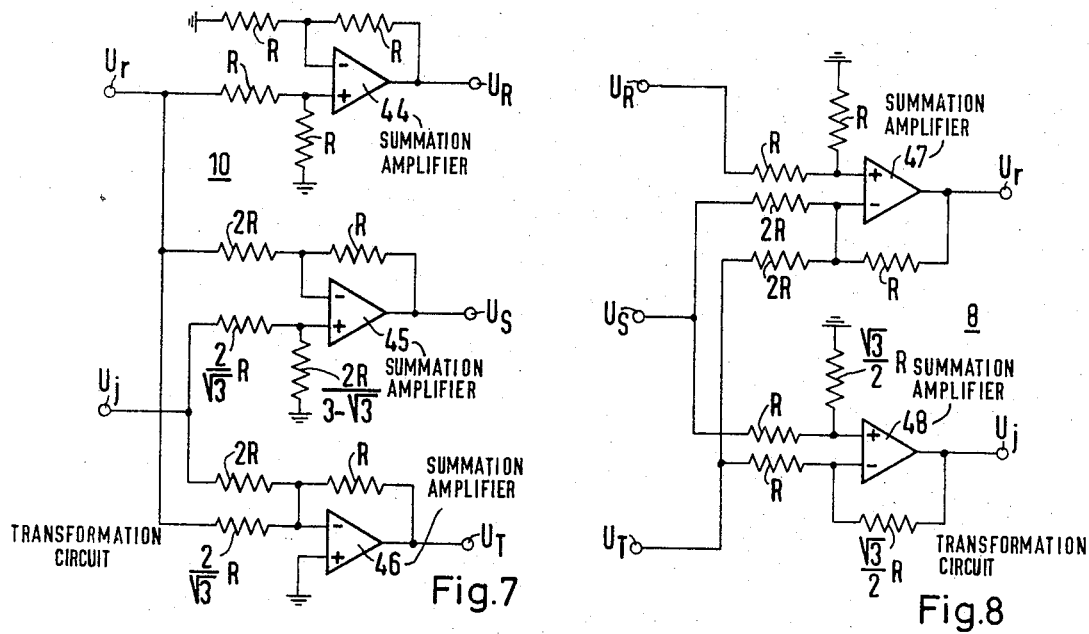
Fig.7
Fig.8
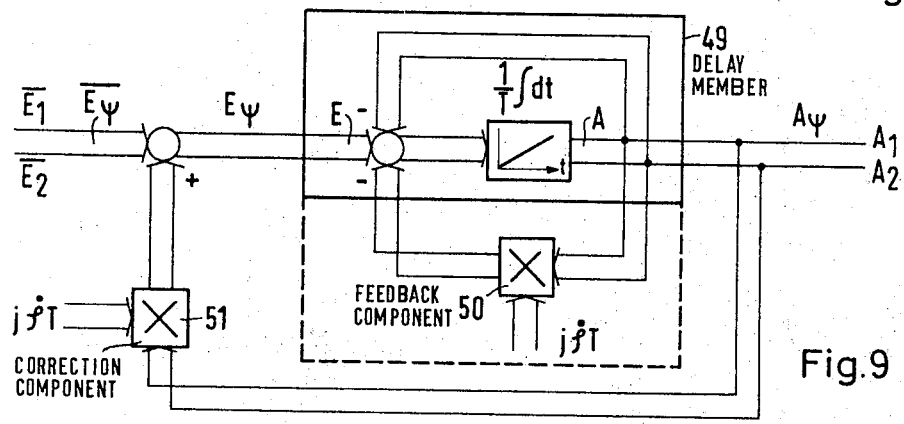
Fig.9
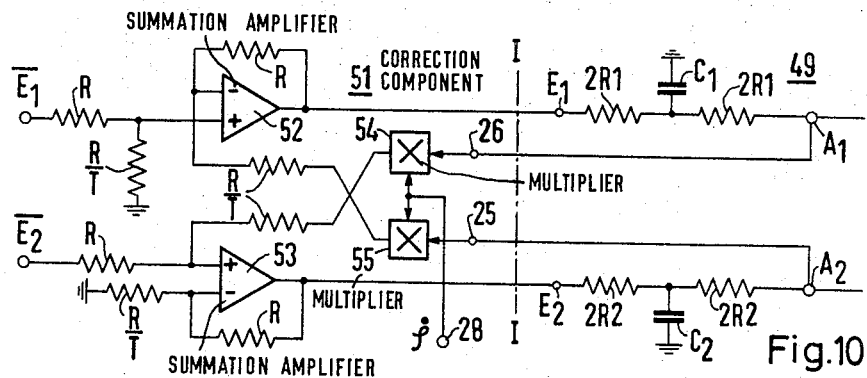
Fig.10

METHOD FOR CONTROLLING ASYNCHRONOUS MACHINES

This is a continuation of application Ser. No. 63,073, filed Aug. 12, 1970 now abandoned.

The invention relates to the control of asynchronous machines. More particularly, the invention relates to a method of and apparatus for controlling inverter-fed asychronous machines.

The method and apparatus of the invention control, independently of speed, and mutually decoupled, the field values and torque in the operation of a motor and the idle and effective power in the operation of a generator.

A regulator or controller may be provided each for the field magnitude or value and for the torque. The regulator will control two inputs of a control or correction unit which supplies the asynchronuous machine with energy and which affects, for example, the magnitude and frequency of the stator current. The field regulator could essentially affect the quantity or magnitude and the torque regulator could affect the stator current frequency. The magnitude of the stator current, however, affects not only the field magnitude or value, but also the torque and, conversely, the frequency of the stator current not only affects the torque, but also the field value. Along with such forward coupling, the predetermination of the stator voltage or stator current, in accordance with the value or magnitude and frequency, results in the field value and the torque and affecting each other within the machine, due to feedback via dynamic members. Such coupling reduces the stability and performance compared to the condition when the adjustment magnitudes are mutually decoupled.

It has been proposed to predetermine the stator current for inverter-fed asynchronous motors in accordance with the magnitude and frequency and to cancel as much as possible, the aforedescribed couplings due to specially adapted control characteristics, by means of function generators. This has the disadvantages that a plurality of function generators must be precisely synchronized, and a parameter change or an adjustment becomes very expensive and difficult.

The principal object of the invention is to provide a new and improved method and apparatus for controlling asynchronous machines.

An object of the invention is to provide a new and improved method of controlling an inverter-fed asynchronous machine.

An object of the invention is to provide new and improved apparatus for controlling an inverter-fed asynchronous machine.

An object of the invention is to provide a method of and apparatus for controlling an inverter-fed asynchronous machines which overcome the disadvantages of known control systems for similar types of machines.

An object of the invention is to provide a method of and apparatus for controlling asynchronous machines with rapidity and with decoupled or independent field magnitudes and torque.

An object of the invention is to provide a method of and apparatus for controlling asynchronous machines with increased operating safety and freedom from maintenance.

An object of the invention is to provide a method of and apparatus for controlling asynchronous machines with decoupling of control magnitudes at least as good as any DC machine drives.

An object of the invention is to provide a method of and apparatus for controlling asynchronous machines with efficiency, effectiveness and reliability.

In accordance with the invention, a method of controlling an inverter-fed asynchronous machine, comprises making the stator current dependent upon two variable field axis related magnitudes b and w of which one effects only the magnitude of a component $I_b$ parallel to the instantaneous rotary field axis of the stator current vector and the other affects only the magnitude of a component $I_w$ perpendicular to the instantaneous rotary field axis. Two stator related field components $\psi_r$ and $\psi_j$ and the variable magnitudes $b$ and $w$ relating to the field axis are formed into two corresponding stator related vector components $i_r$, $i_j$ and $I_r^*$, $I_j^*$ for affecting the stator current as datum control magnitudes. The stator related field components $\psi_r$ and $\psi_j$ and the stator related vector components $i_r$, $i_j$ and $I_r^*$, $I_j^*$ are perpendicular to each other. The field axis related magnitudes $b$ and $w$ are made in the form of control magnitudes dependent upon the difference between datum values $I_b^*$, $I_w^*$ and actual values $I_b$, $I_w$ of field axis related stator current components.

At least one of the field axis related magnitudes $b$ and $w$ and the field axis related stator current component datum value $I_w^*$ are made dependent upon the difference between a predetermined datum rotary speed $n^*$ of the asynchronous machine and the actual rotary speed $n$ of the machine. The actual values $I_b$, $I_w$ of the field axis related stator current components are formed from the perpendicular stator related field components $\psi_r$ and $\psi_j$ and perpendicular stator related current components $I_r$, $I_j$. The control vector is susceptible to a turning stretching in the rotational direction of the field in dependence upon the stator current vector, the angular velocity $\dot\phi$ of the rotational field axis, and a delay constant, especially the stray field constant of the asynchronous machine. The stray field constant is effective between the control input for the stator current and the stator current. The control vector is also susceptible to a turning stretching in a direction opposite the rotational direction of the field in dependence upon the field vector, the angular velocity of the rotational field axis, and the principal field constant of the asynchronous machine.

In accordance with the invention, apparatus for controlling an inverter-fed asynchronous machine comprises a component converter having two adding amplifiers each having two inputs and four multipliers each having two inputs and an output. Each output of the multipliers is connected to a corresponding input of the amplifiers. A first input terminal connected to an input of each of two of the multipliers applies a stator related field component voltage cos $\phi$ thereto. A second input terminal connected to an input of each of the other two of the multipliers applies a stator related field component voltage sin $\phi$ thereto. A third input terminal connected to the other input of each of two of the multipliers applies a field axis related voltage $b$ or a stator related component voltage $I_r$ thereto. A fourth input terminal connected to the other input of each of the other two of the multipliers applies a field axis related to voltage w or a stator related component voltage $I_j$ thereto.

A vector analyzer has a pair of inputs and a pair of outputs connected to the first and second input terminals of the component converter. The vector analyzer has two amplifiers each having an input and an output and two multipliers. Each of the amplifiers has a feedback circuit which includes a corresponding one of the multipliers. A first input terminal connected to the input of one of the amplifiers applies a stator related field component $\psi_r$ thereto. A second input terminal connected to the input of the other of the amplifiers applies a stator related field component $\psi_j$ thereto. Two additional multipliers each have an output and an input connected to the output of a corresponding one of the amplifiers for squaring the output voltage of the corresponding amplifier. An integrator has an input coupled to the outputs of the additional multipliers and an output connected to an input of each of the two multipliers for adding the squared output voltages of the amplifiers and comparing the resultant sum with a constant magnitude. One side of the output of the integrator of the vector analyzer is limited to zero.

An angular velocity measuring component has a pair of inputs connected to the outputs of the vector analyzer and an output coupled to inputs of the component converter. The angular velocity measuring component has a pair of differential components each having an input and an output. A pair of multipliers each have an input connected to the output of a corresponding one of the differential components, another input and an output. A first input terminal connected to the input of one of the differential components and to the other input of the multiplier connected to the other differential component applies a stator related field component voltage cos $\phi$ thereto. A second input terminal connected to the input of the other of the differential components and to the other input of the multiplier connected to the other differential component applies a stator related field component voltage sin $\phi$ thereto. A summation amplifier has an output and a pair of inputs each coupled to the output of a corresponding one of the multipliers for subtractively combining the outputs of the multipliers. An output terminal is connected to the output of the summation amplifier.

An additional vector analyzer has outputs and a pair of inputs connected to outputs of the component converter. The additional vector analyzer produces output component voltages cos $\beta^*$ and sin $\beta^*$ at two of its outputs. A current regulator has a datum value input connected to a third output of the additional vector analyzer for an intermediate DC current $I_{al}$. An inverter has control means. An angular switching circuit has inputs coupled to the two of the outputs of the additional vector analyzer and outputs connected to the control means of the inverter.

The angular switching circuit comprises a plurality of amplifiers having outputs and inputs connected to outputs of the additional vector analyzer for producing a plurality of AC voltages shifted by 60° relative to each other. A plurality of critical value indicators each have an input connected to the output of a corresponding one of the amplifiers. A plurality of AND gates each have two inputs connected to the outputs of corresponding ones of the critical value indicators and an output connected to the control means of the inventer.

A phase correction regulator has inputs connected to the outputs of the additional vector analyzer and outputs connected to the inputs of the angular switching circuit for correcting the angular position of the stator current vector. The phase correction regulator comprises an integrator having an input and an output. Input means applies to the input of the integrator a magnitude dependent upon the angular difference between a control vector determined by the component voltages cos $\beta^*$ and sin $\beta^*$ at the outputs of the additional vector analyzer and the stator current vector. Phase rotating means rotates the control vector which is supplied to the input of the angular switching circuit. The phase rotating means has an input connected to the output of the integrator, other inputs and outputs. The phase rotating means comprises a pair of multipliers each having a pair of inputs and an output and an inverter amplifier having an input connected to an input of the phase correction regulator and an output connected to an input of one of the multipliers. An input of each of the multipliers is connected to the output of the integrator.

The phase correction regulator further comprises an additional pair of multipliers each having a pair of inputs and an output. An input terminal connected to an input of one of the additional multipliers applies a voltage $I_S$ proportional to the stator phase current thereto. An input terminal connected to an input of the other of the additional multipliers applies a voltage $I_R$ proportional to the stator phase current. Means couples the inputs of the phase correction regulator to the other input of each of the additional multipliers for applying thereto AC voltages $I_R^*$ and $I_S^*$ formed from the component voltages cos $\beta^*$ and sin $\beta^*$ of the control vector. A summation amplifier has a pair of inputs each connected to an output of a corresponding one of the additional multipliers and an output coupled to the input of the integrator. The output voltages of the additional multipliers are subtractively supplied to the summation amplifer.

The phase correction regulator further comprises a phase angle measuring circuit having an output coupled to the input of the integrator and a pair of inputs. An input terminal connected to an input of the phase angle measuring circuit applies a voltage $I_R$ proportional to the stator phase current thereto. An input terminal connected to the other input of the phase angle measuring circuit applies an AC voltage $I_R^*$ derived from the component voltages cos $\beta^*$ and sin $\beta^*$ of the control vector thereto. The phase correction regulator further comprises a third additional multiplier having an input coupled to the output of the summation amplifier, an output connected to the input of the integrator and another input. An input terminal connected to the other input of the third additional multiplier supplies a magnitude $\phi$ proportional to the angular velocity of the field thereto.

In accordance with the invention, apparatus for controlling an inverter-fed asynchronous machine comprises a harmonicfree two phase generator for in-phase smoothing of field component voltages. The generator has an input and a pair of outputs. A PI regulator has an input and an output connected to the input of the generator for controlling the frequency of the generator. Input means connected to the input of the PI regulator applies thereto a magnitude dependent upon the difference between the phase angle $\epsilon$ of a vector E and the phase $\alpha$ of a vector produced by the generator. The generator comprises two integrators and two multipliers connected in series circuit arrangement with one of the multipliers connected to the input of the generator, followed by one of the integrators, the other of the multipliers and the other of the integrators. Four multipliers each have two inputs and an output. One output of the generator is connected to an input of each of two of the multipliers and the other output of the generator is connected to an input of each of the other two of the multipliers. An input terminal connected to the other input of each of two of the multipliers applies a vector component voltage E1 thereto. An input terminal connected to the other input of each of the other two of said multipliers applies a vector component voltage E2 thereto. A pair of summation amplifiers each have a pair of inputs coupled to the outputs of corresponding ones of the multipliers and an output for producing output magnitudes proportional to the sine and cosine of a differential angle $\epsilon - \alpha$. A divider has a pair of inputs each coupled to the output of a corresponding one of the summation amplifiers and an output for producing a magnitude proportional to the tangent of the differential angle.

One output of the divider is the divisor input and the other input of the divider is the dividend input and only positive magnitudes of the summation amplifier output voltage are applied to the divisor input of said divider. A pair of Zener diodes are connected in series in opposing polarities between the output of the divider and the input of the generator. Means coupled to the input of the generator provides a magnitude dependent upon the angular velocity of the vector E for increasing the disturbance quantity of the generator.

A pair of additional multipliers each have a pair of inputs and an output. Smoothing means coupled the output of the summation amplifier applied to the divisor input of the divider to an input of each of the additional multipliers. An output of the generator is connected to the other input of one of the additional multipliers and the other output of the generator is connected to the other input of the other of the additional multipliers.

The apparatus is adapted to synchronize a power supply and to smooth the synchronizing voltage of control units for phase angle controlled rectifiers.

It is thus seen that, in comparison with the proposed method of control, in the method of the invention, the stator current depends on two variable magnitudes, of which one affects the magnitude of the component which is parallel to the instantaneous rotary field axis and the other affects the magnitude of the stator current vector component which is perpendicular to the instantaneous rotary field axis. A basic principle of the invention is the provision of an oriented vector component control or vector component regulation, in which the stator current vector of the asynchronous machine is predetermined by a field perpendicular and a field parallel current component. The field parallel component affects only the field value or magnitude and the field perpendicular component affects only the torque of the machine. The aforedescribed couplings are thus cancelled. The field value directly follows the predetermination of the field parallel current component, with the principle field time constant. Thhe torque directly follows the predetermination of the field perpendicular control component.

The manner of converting the field axis related magnitudes into appropriate stator current vector related components is arbitrary. In accordance with the invention, two corresponding stator related vector components, which influence the stator current as datum or reference or control magnitudes or as datum control values, may be formed without difficulty and inexpensively from two stator related field components and both field axis related magnitudes. Two magnitudes are suitable in principle as such vector components by which a vector may be described. The spatial representation of the vector components may be shown in a cartesian coordinate system, an oblique angle coordinate system, or a polar coordinate system. An especially simple embodiment of the invention is provided when the stator related field components and the stator related vector components, which correspond to the field axis related magnitudes, are mutually perpendicular.

The field axis related magnitudes, as regulating or control quantities, are made to depend on the difference between datum and actual values for field axis related stator current components. The control of the predetermined vector components of the stator current is affected in a field axis related coordinate system, so that DC regulators may be utilized. DC regulators are advantageous, since they have a high degree of accuracy. If a superimposed speed regulator is provided for supplying the datum values of the field axis related stator current components, the apparatus of the invention provides very valuable speed regulating drive statically and dynamically.

In accordance with another embodiment of the invention, in order to compensate for a possible phase angle deviation between the regulator or control vector and the stator current vector produced by the outer or inner delay components of the machine, it is advantageous, when a turning stretching of the regulator or control vector occurs in the rotational direction of the field, which depends upon the stator current vector, the angular velocity of the rotary field axis, and the effective delay time constants or parameters between the stator current, which influences the regulator input, and the stator current itself, especially the stray field parameters of the asynchronous machine. In a similar manner, the phase shifting effect of the principal field parameters may thus be reduced when the turning stretching of the regulator or control vector is opposite to the rotational direction of the field and depends upon the field vector, the angular velocity of the rotor or rotary field axis and the principal field time parameters of the asynchronous machine.

In accordance with the invention, a parameter converter is utilized, which comprises two adding or summation amplifiers and four multipliers, which are supplied with stator related field parameter voltages and field axis related or stator related parameter voltages in normalized pairs by a vector analyzer whereby the outputs of each pair are connected to an amplifier input. In accordance with another feature of the invention, the vector analyzer comprises two feedback amplifiers having inputs which are supplied with voltages proportional to the perpendicular stator related parameters via a multiplier. The squared output voltages are added and compared with a constant magnitude in the input of the regulator, which preferably comprises an integrated regulator. The output magnitude of the integrated, regulator is applied to a corresponding input of both multipliers. The normalization which is accomplished with the assistance of regulator comparison is highly accurate.

If the method or apparatus of the invention is applied to an asynchronous machine which may be supplied by an intermediate circuit current inverter with impressed current, it is advantageous that the parameter converter be connected, outside the output terminal, to an additional vector analyzer. The regulator output of the additional vector analyzer is connected to the datum value input of a regulator for the direct current of an intermediate circuit and the amplifier output voltages of the additional vector analyzer are directly supplied to an angular switching circuit for the control electrodes or grids of the inverter. This may be accomplished via an additional regulator. In this manner, at least the stator current vector is predetermined in accordance with value or magnitude and phase, that is, in polar coordinates.

In order that the invention may be readily carried into effect, it will now be described with reference to the accompanying drawings, wherein.

Figure 2:
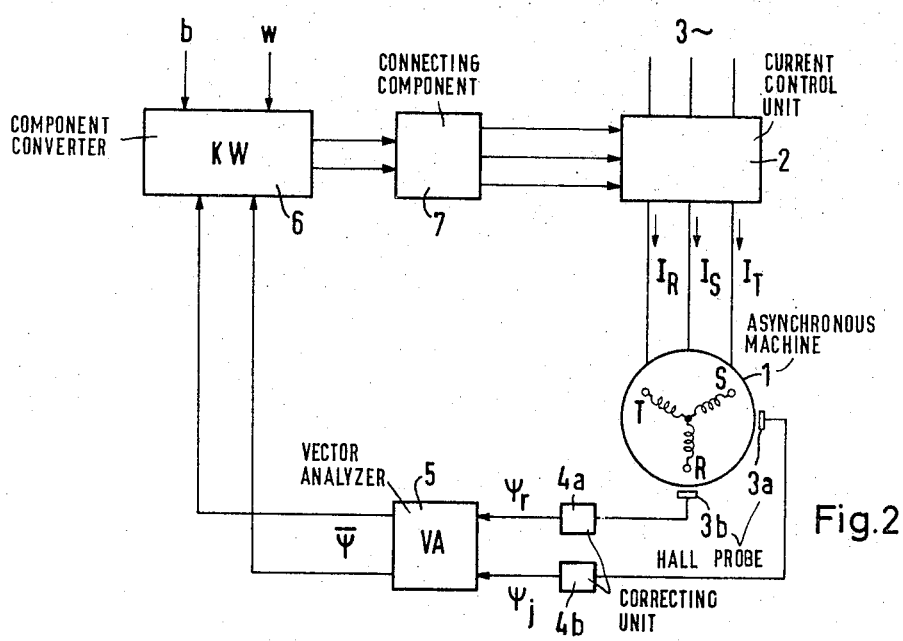
FIG. 2 is a block diagram of an embodiment of the apparatus of the invention for undertaking the method of the invention.
Figure 3:
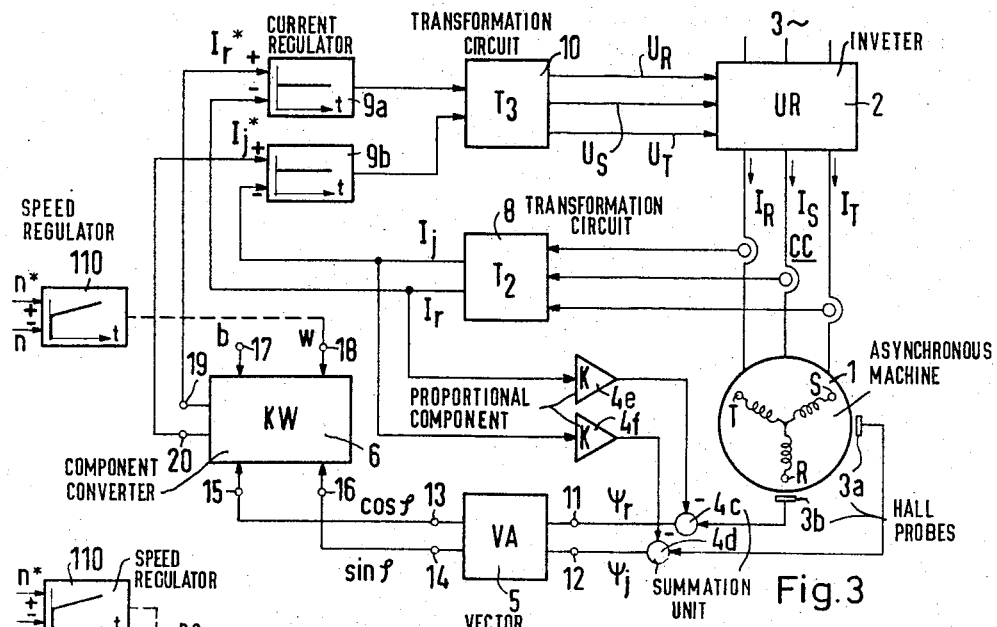
FIG. 3 is a block diagram of an embodiment of a vector component regulator of the invention in a perpendicular coordinate system.
Figure 4:
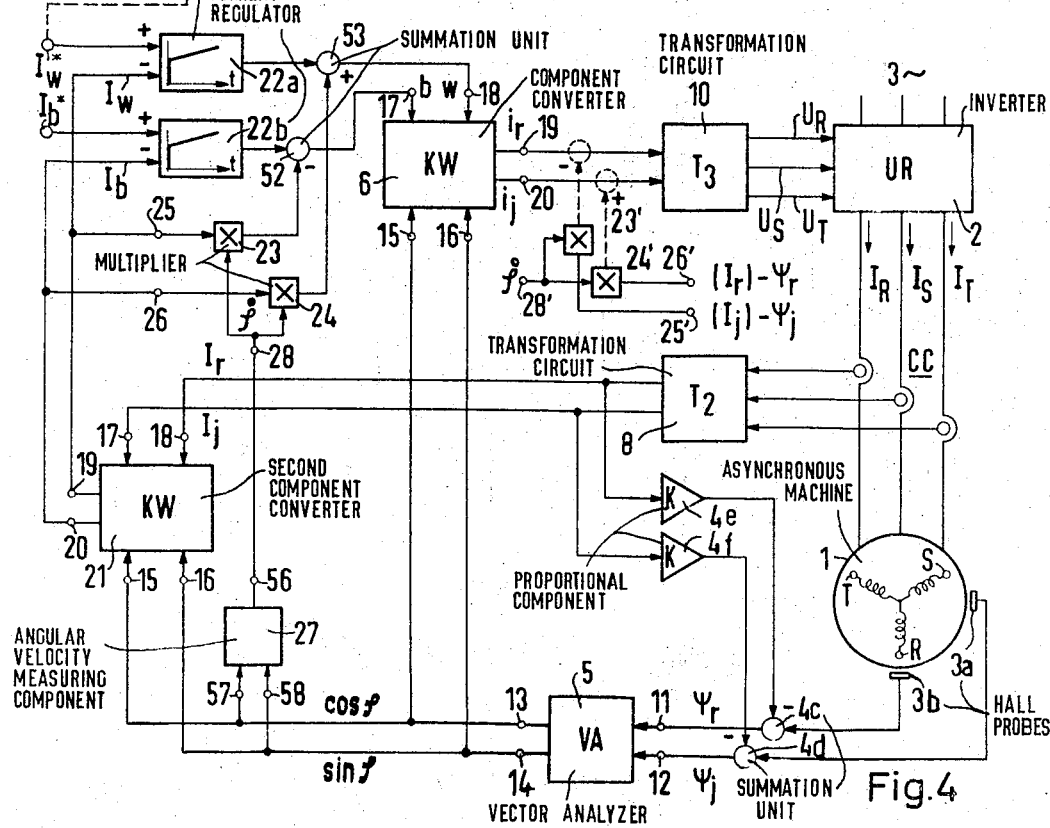
FIG. 4 is a block diagram of a modification of the embodiment of FIG. 3.
Figure 6:
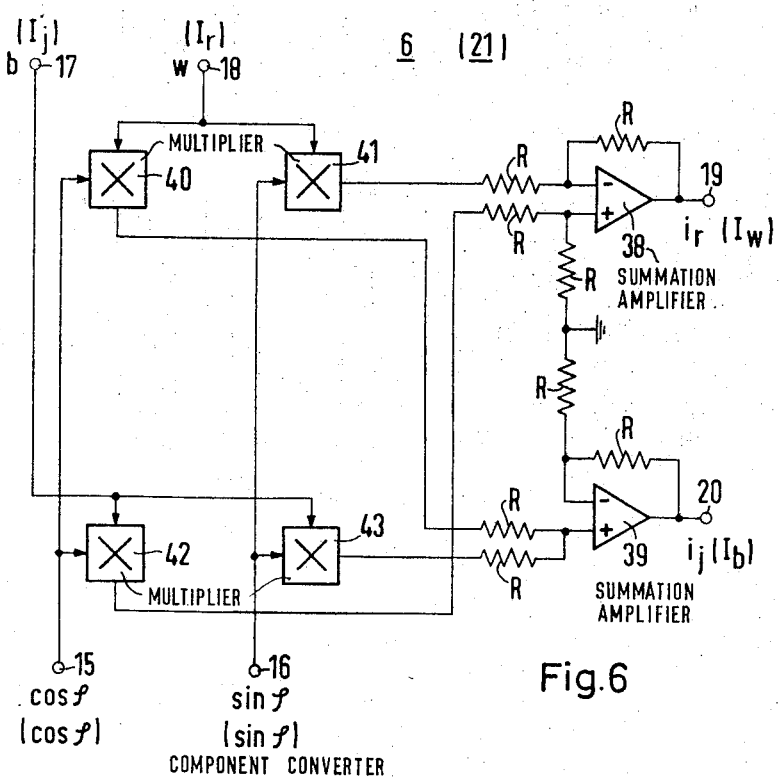
Figure 11:
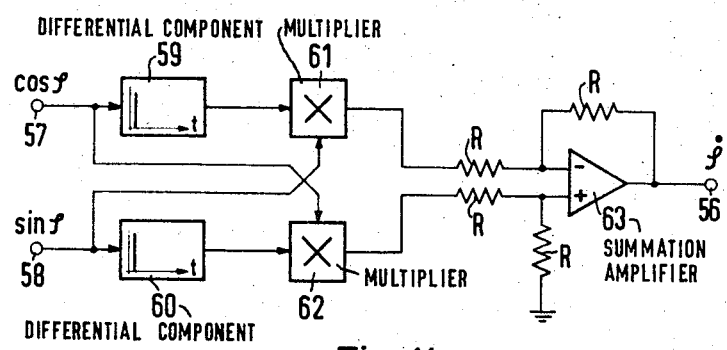
Figure 12:
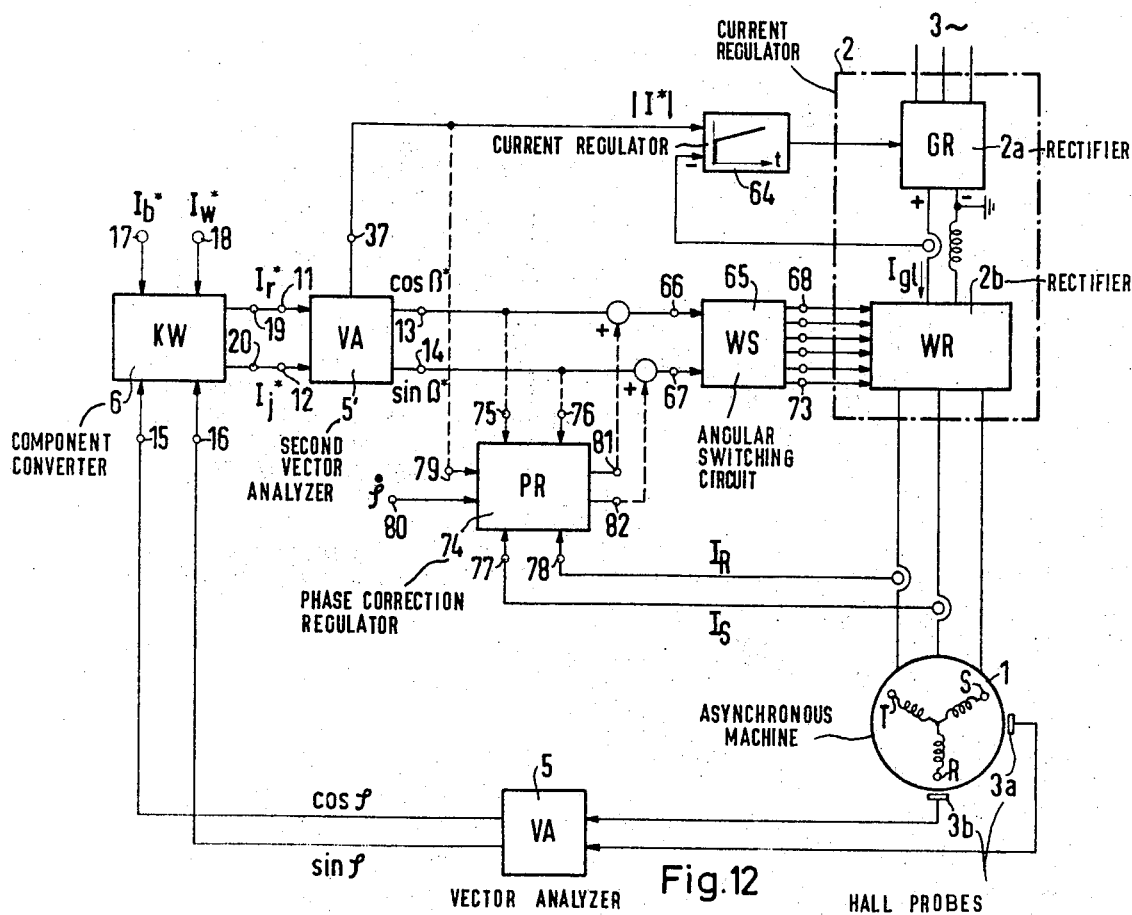
Figure 13:
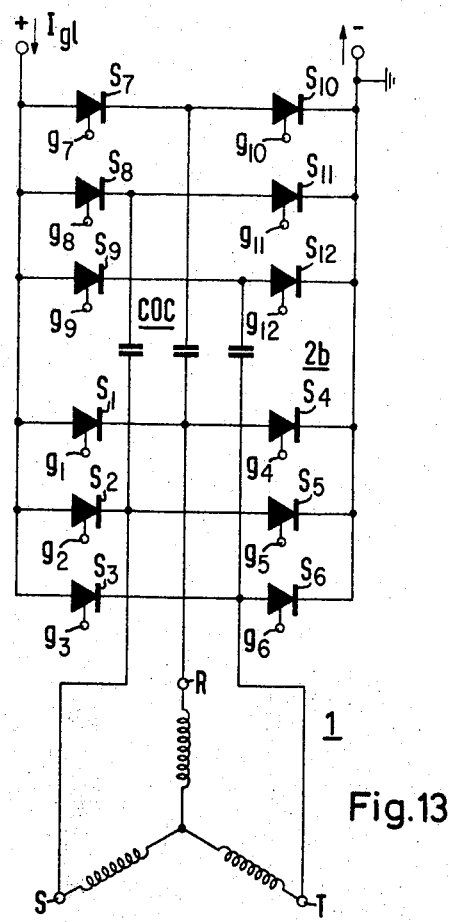
Figure 14:
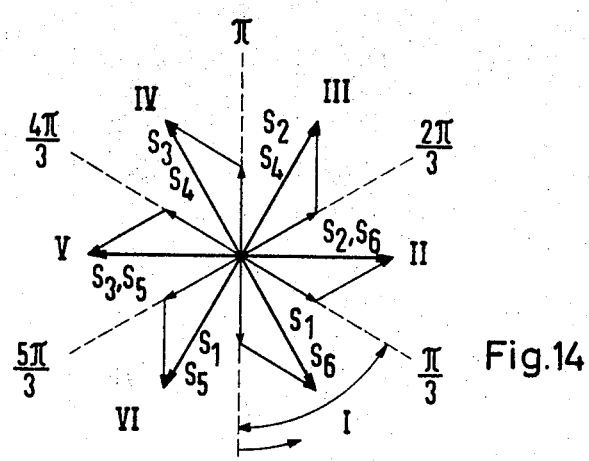
Figure 15:
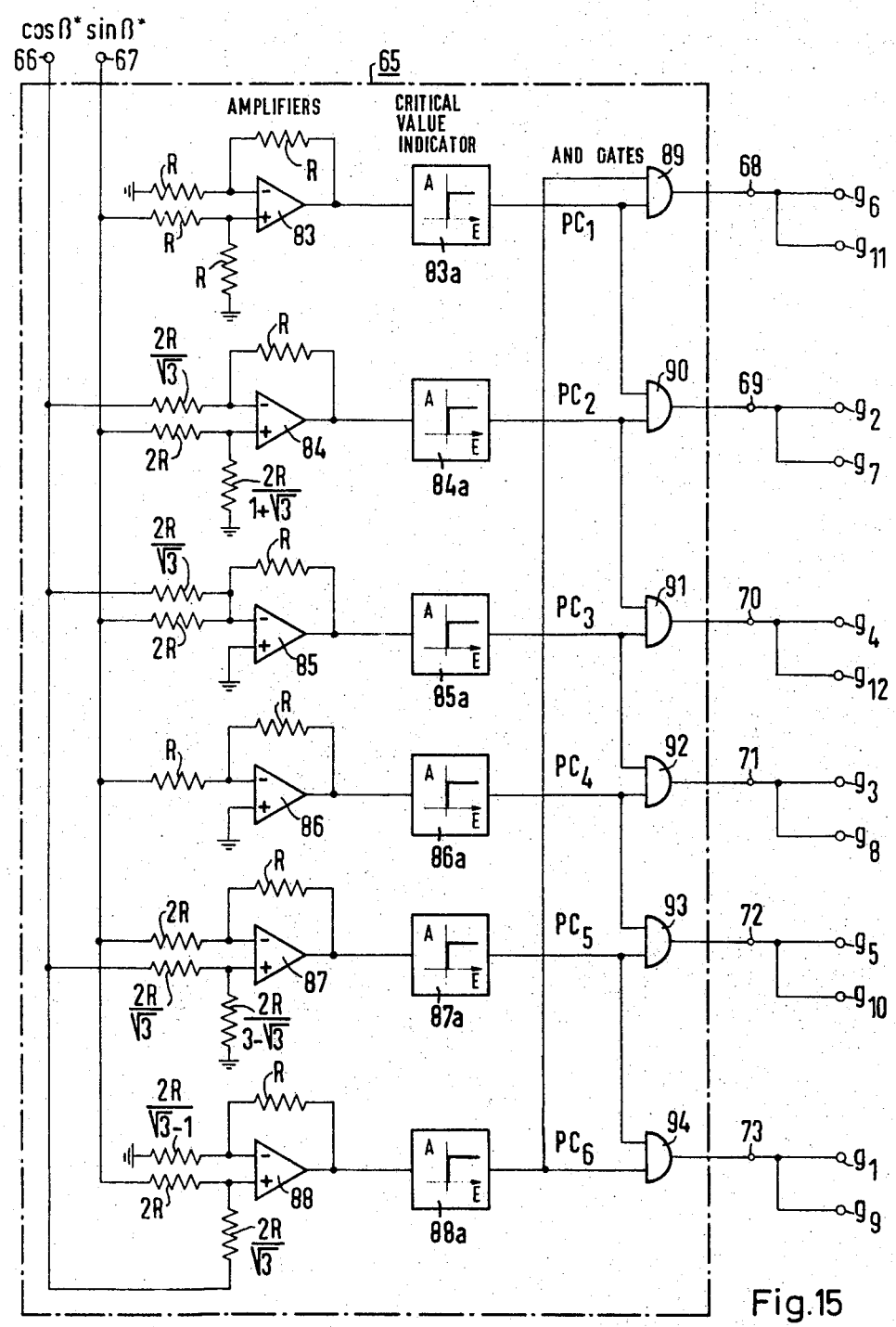
Figure 16:
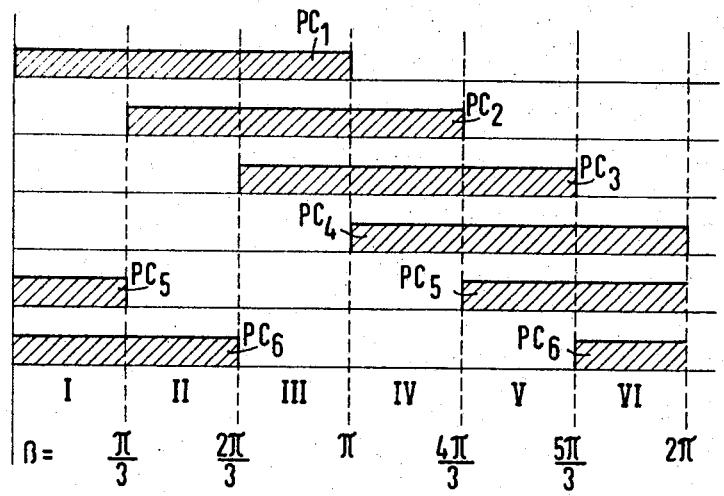
Figure 17:
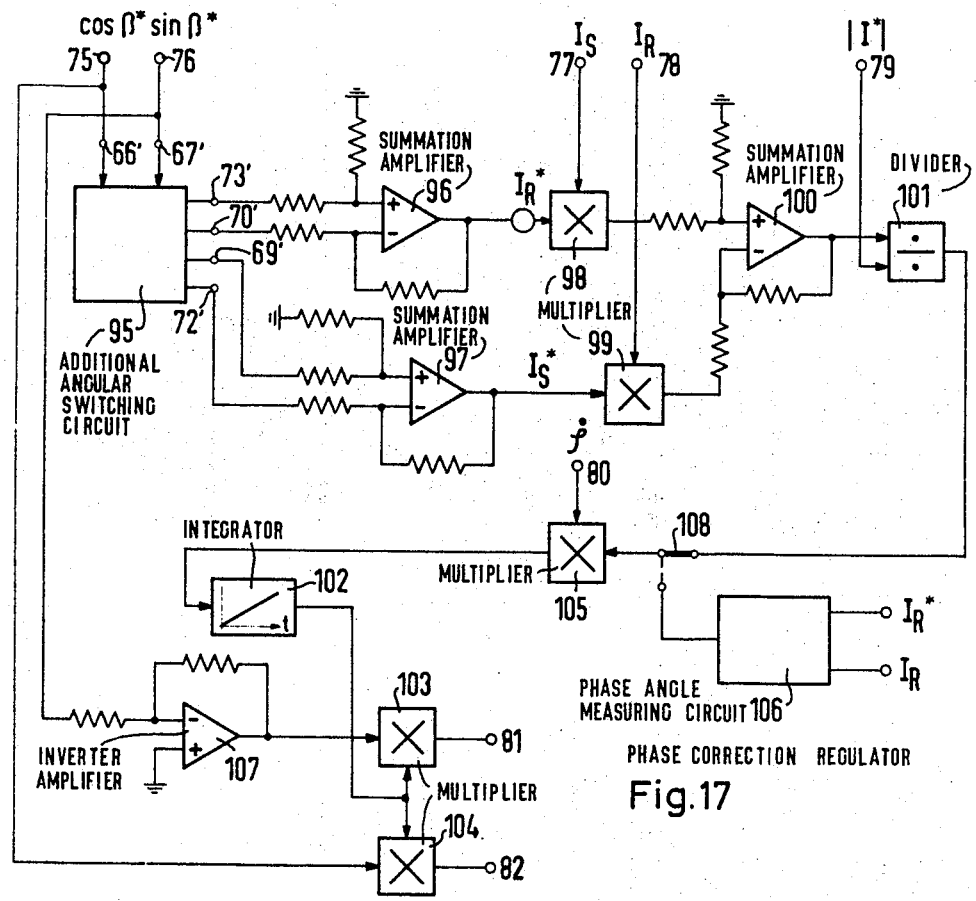
Figure 18:
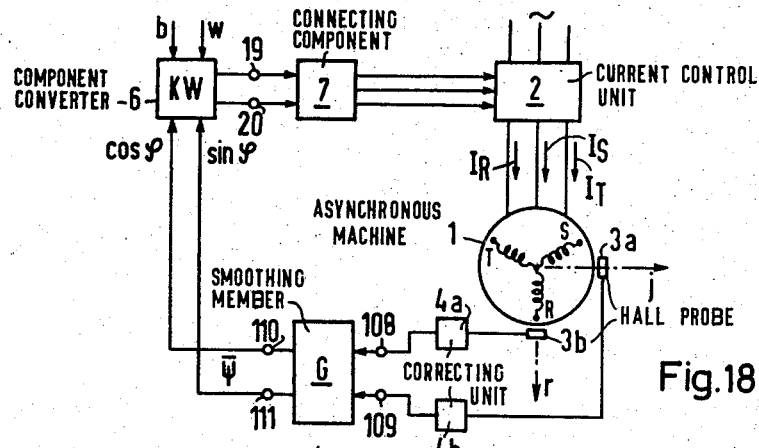
Figure 19:
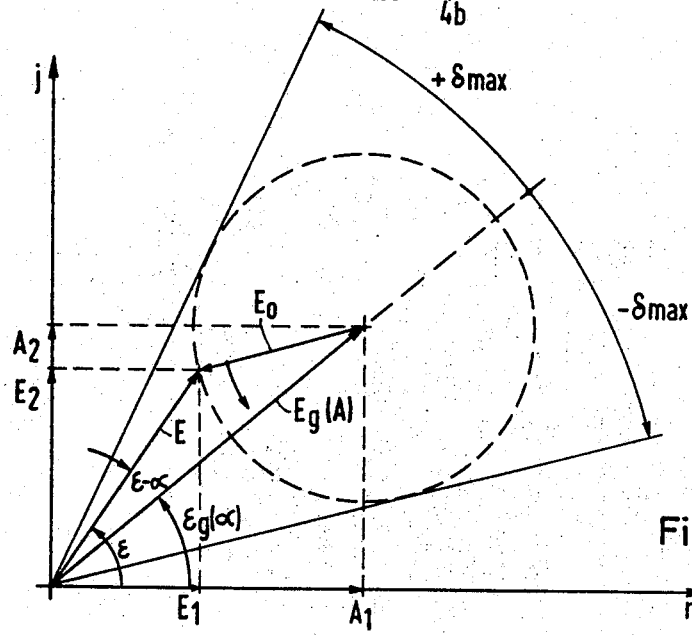
Figure 20:
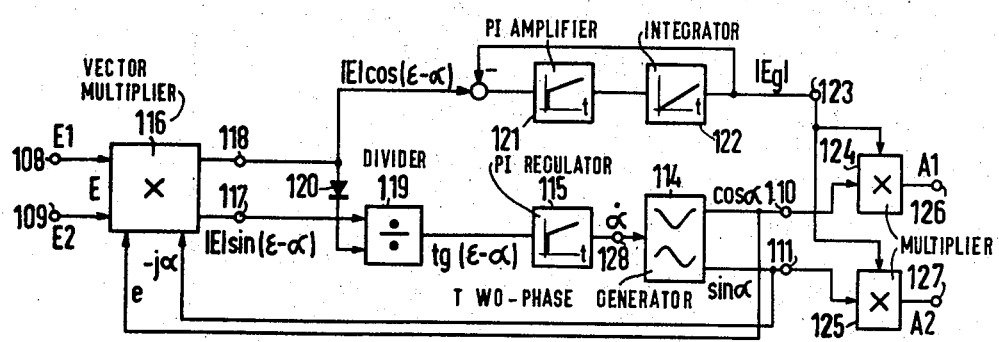
Figure 21:
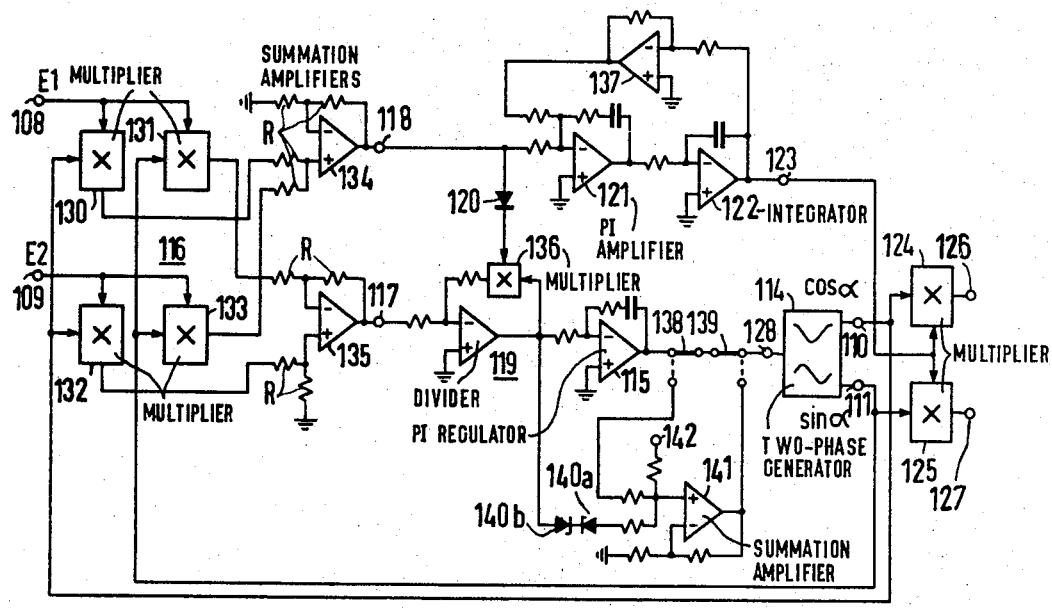

FIG. 6 is a circuit diagram of an embodiment of a component converter which may be utilized as the component converter 6 of FIGS. 2, 3 and 4 or as the second current converter 21 of FIG. 4;

FIG. 7 is a circuit diagram of an embodiment of a transformation circuit which may be utilized as the transformation circuit 10 of FIGS. 3 and 4;

FIG. 8 is a circuit diagram of an embodiment of a transformation circuit which may be utilized as the transformation circuit 8 of FIGS. 3 and 4;

FIG. 9 is a block diagram illustrating the phase shifting effect of delay components and their compensators;

FIG. 10 is a circuit diagram of the embodiment of FIG. 9;

FIG. 11 is a block diagram of an embodiment of an angular velocity measuring circuit which may be utilized as the angular velocity measuring component 27 of FIG. 4;

FIG. 12 is a block diagram of an embodiment of a vector component regulator of the invention in a perpendicular coordinate system in which the regulation vector components are not predetermined by perpendicular vector components;

FIG. 13 is a circuit diagram of an embodiment of an inverter or rectifier of the current regulator 2 of FIG. 12;

FIG. 14 is a vector diagram illustrating the ignition sequence of the principal thyristors of the inverter of FIG. 13;

FIG. 15 is a circuit diagram of an embodiment of an angular switching circuit which may be utilized as the angular switching circuit 65 of FIG. 12;

FIG. 16 is a graphical presentation of the output pulses produced by the angular switching circuit of FIG. 15;

FIG. 17 is a block diagram of an embodiment of a phase correction regulator which may be utilized as the phase correction regulator of FIG. 12;

FIG. 18 is a block diagram of another embodiment of the apparatus of the invention, including a smoothing device;

FIG. 19 is a vector diagram for explaining the operation of the smoothing device;

FIG. 20 is a block diagram of an embodiment of a smoothing device which may be utilized as the smoothing device G of FIG. 18;

FIG. 21 is a circuit diagram of the embodiment of FIG. 20; and

Figure 22:
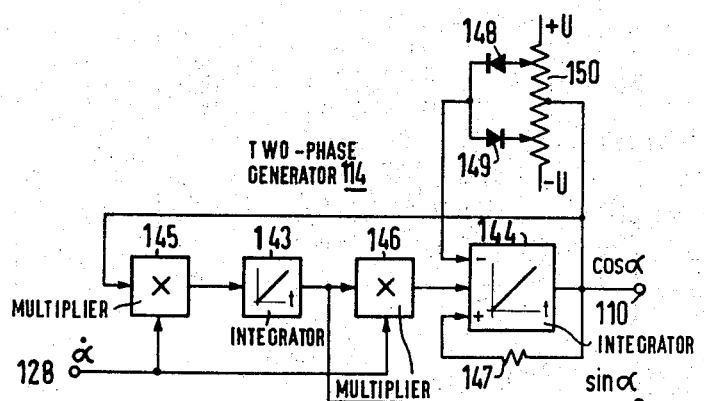

FIG. 22 is a block diagram of an embodiment of a two phase generator 114 which may be utilized as the two phase generator 114 of FIGS. 20 and 21.

In the figures the same components are identified by the same reference numerals.

Figure 1:
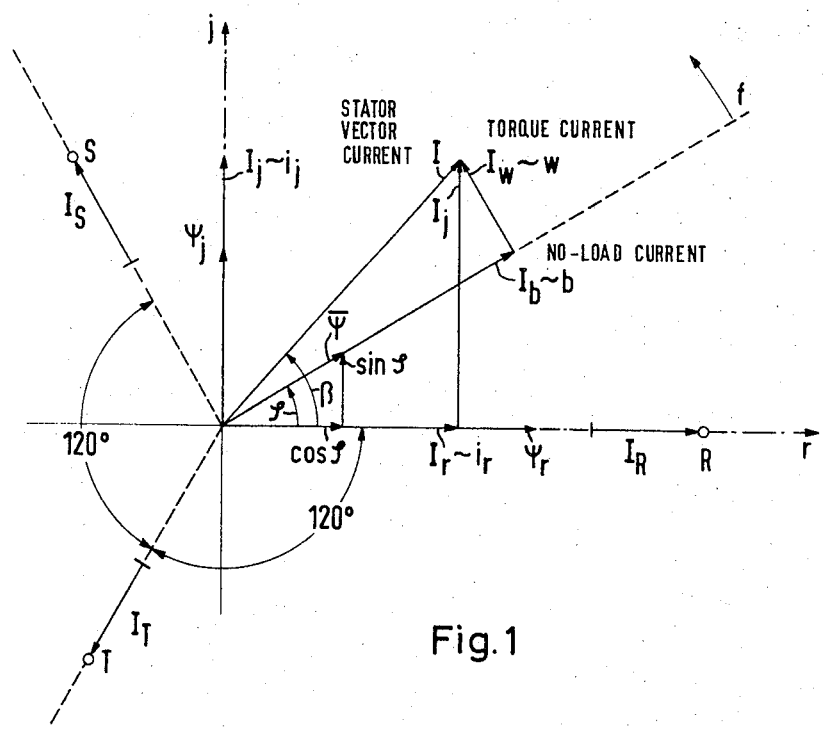
FIG. 1 is a vector diagram of a three phase asynchronous machine, with components which occur at a mutual displacement of 120° in three axes.

FIG. 1 is a vector diagram of a three phase asynchronous machine with components occurring at a mutual displacement of 120° in three axes. The components of the rotary stator current vector I are $I_R$, $I_S$ and $I_T$, and rotate at an angular velocity of $i\beta/dt = \beta$. The stator current vector may also be described in a cartesian or perpendicular, stator related, coordinate system, having axes $r$ and $j$, with their origin at the rotational axis of the machine. The components or parameters of the stator vector I are $I_r$ and $I_j$ in the stator related coordinate system. The axis $r$ of the perpendicular coordinate system should coincide with the direction of the winding axis of the phase R.

The stator current vector I may also be described in a cartesian or perpendicular coordinate system having an origin at the axis $f$ of rotation of the machine. The axis $f$ of rotation of the machine must always be considered to be in the direction of the instantaneous rotational field axis and therefore shifts relatively to the stator related coordinate system for the angle $\phi$. The angular velocity of the rotational field axis is $d\phi/dt = \dot\phi$.

Parameters or components which illustrate the stator current vector I in this coordinate system are the magnitudes $I_b$ and $I_w$. The magnitude $I_b$ is always parallel to the instantaneous rotational field axis f and the magnitude $I_w$ is always perpendicular to said axis. In the stationary condition of operation of the asynchronous machine, the components $I_b$ and $I_w$ are DC magnitudes. The component $I_b$ corresponds to the idle or no-load current of the machine, that is, the field producing part of the stator current. The component $I_w$ corresponds to the effective torque or moment producing part of the stator current.

The stator vector current I may also be illustrated in the field axis related coordinate system, and also by means of polar coordinates, that is, by its magnitude and its angular position relative to the axis f, which corresponds to the difference between the angles $\beta$ and $\phi$. In FIG. 1, stator related perpendicular field components $\psi_r$ and $\psi_j$ are indicated, as is a polarized unit vector $\overline{\psi} = e^{j\phi}$ having components cos $\phi$ and sin $\phi$ which appear in the stator related coordinate system $r, j$.

FIG. 2 is a block diagram of an embodiment of the apparatus of the invention for undertaking the method of the invention. In FIG. 2, an asynchronous machine 1 is energized from an AC power supply at its stator phase terminals R, S and T via a suitable current control unit 2, which adjusts the phase currents $I_R$, $I_S$ and $I_T$. The current control unit 2 may comprise, for example, an adjustable transformer, a magnetic amplifier, or an inverter or static frequency changer. Two Hall probes 3a and 3b are positioned on the armature circumference of the asynchronous machine 1 and are mutually displaced about 90° from each other. Instead of the Hall probes 3a and 3b, any other suitable magnetic field responsive transmitting elements may be utilized.

The air gap field is indicated by two voltages, which are phase displaced by 90° and are connected to correcting units 4a and 4b. The corresponding component voltages $\psi_r$ and $\psi_j$ are provided by the correcting units 4a and 4b, respectively, and are provided by the rotor interlinked rotational field vector. A vector analyzer 5 derives from the component voltages $\psi_r$ and $\psi_j$ two stator related components which describe the polarized unit vector $\overline{\psi} = e^j \phi$. The stator related components are supplied to a component converter 6.

The component converter 6 forms two input magnitudes $b$ and $w$ in relation to the rotational field axis about two corresponding stator related vector components for the stator current. The input magnitudes $b$ and $w$ are supplied to the control inputs of the current control unit 2 via a intermediate connecting component 7, for example, for the conversion of two axis components into three axis components. It is essential that, via the field oriented vector component control utilizing the field axis related magnitudes $b$ and $w$, the component position parallel to the instantaneous rotational field axis of the stator current vector and the component positioned perpendicular to said axis, the active current and field values may be affected or controlled independently and decoupled from each other.

FIG. 3 shows a vector component regulator of the invention in a perpendicular or cartesian coordinate system. The asynchronous machine 1 is energized by an inverter 2 such as, for example, a direct current inverter. The direct current inverter 2 has three control inputs $U_R$, $U_S$ and $U_T$ which respectively affect the phase current $I_R$, $I_S$ and $I_T$ of the asynchronous machine 1. A current converter or current transformer CC is built into the stator current leads from the inverter 2 to the asynchronous machine 1. The secondary windings of the current transformer CC convert, via a transformation circuit 8, the three phase currents $I_R$, $I_S$ and $I_T$ into mutually perpendicular components $I_r$ and $I_j$.

The perpendicular components $I_r$ and $I_j$ provided by the transformation circuit 8 are supplied as actual values to current regulators 9a and 9b, respectively. The output voltages of the current regulators 9a and 9b are converted in a transformation circuit 10 into appropriate three phase component voltages and are applied to the control inputs of the inverter 2. The output magnitudes $I_r$ and $I_j$ of the transformation circuit 8 are also supplied to two summation or adding units 4c and 4d via two proportional components 4e and 4f, respectively. The output magnitudes $I_r$ and $I_j$ are subtracted in the adding units 4c and 4d from the voltages of the Hall probes 3a and 3b which measure the air gap field whereby the proportionality factor K of both proportional components 4e and 4f is substantially proportional to the relation of the actual rotor inductivity to the principal inductivity of the asynchronous machine 1.

Two perpendicular components $\psi_r$ and $\psi_j$ of the rotational field, produced by the adding units 4c and 4d, are supplied to input terminals 11 and 12 of the vector analyzer 5. The vector analyzer 5 provides, at its input terminals 13 and 14, the corresponding normalized component voltages, which are the components $\cos \phi$ and $\sin \phi$ of a unit vector $\overline{\psi} = e^j \phi$ which always points in the direction of the instantaneous rotational field axis. The component converter 6 produces stator related stator current component datum values or magnitudes $I_r^*$ and $I_j^*$ from the field axis related input magnitudes $b$ and $w$, supplied to its input terminals 17 and 18, and the stator related field components $\cos \phi$ and $\sin \phi$, applied to its input terminals 15 and 16. The magnitudes $I_r^*$ and $I_j^*$ are supplied to the current regulators 9a and 9b, respectively.

The circuit arrangement of FIG. 3 permits a mutually decoupled torque and field regulation of the asynchronous machine 1. Only the input magnitudes $b$ and $w$ of the component converter 6 need be changed in order to change the appropriate datum values. If the input magnitude $w$ of the component converter 6, as indicated by broken lines in FIG. 3, is the output magnitude of a speed regulator 110, to which an input voltage proportional to the nominal speed $n^*$ and the actual speed of $n$ of the asynchronous machine 1 is supplied, the circuit arrangement of FIG. 3 functions as a speed regulator with subordinated torque regulation.

In the circuit arrangement of FIG. 3, sinusoidal stator related datum values $I_r^*$ and $I_j^*$ are derived from the field axis related magnitudes $b$ and $w$. FIG. 4 illustrates an embodiment in which the field axis related actual values are provided and are then compared directly in DC current regulators 22a and 22b of predetermined datum values $I_w^*$ and $I_b^*$. A DC regulator may be utilized, since in the stationary condition of operation of the asynchronous machine, it is concerned with DC magnitudes, as the field axis related datum and actual values of the stator current vector then always relate to DC magnitudes. DC regulators have proven to be superior to AC regulators dynamically and in accuracy.

The field axis related magnitude in the embodiment of FIG. 4 shows the result of a regulator comparison between the field axis related datum values $I_w^*$ and $I_b^*$ and the field axis related actual values $I_w$ and $I_b$. The field axis related actual values $I_w$ and $I_b$ are provided by a second component converter 21 from the perpendicular stator related components of the stator current vector and the perpendicular components of the unit vector $\overline{\psi} = e^j \phi$ point in the direction of the rotational field axis, as hereinafter described. The DC current regulators 22a and 22b are designed as PI regulators, for the greatest accuracy, and provide two field axis related components of a regulator vector at their outputs. The outputs of the DC current regulators 22a and 22b are supplied to the inputs 17 and 18 of the component converter 6 via summation or adding units 52 and 53, respectively. The component converter 6 provides the corresponding stator related regulator commands.

The speed regulator 110 may also be superimposed in the embodiment of FIG. 4, as shown by broken lines. The output magnitude of the speed regulator 110 provides the datum value $I_w^*$ of the DC current regulator 22a. When the components of the control vector affect the voltage inputs $U_R$, $U_S$ and $U_T$ of the inverter 2, there is a phase shift between the control vector and the stator current vector due to the effect of possible delay components, especially stray field constants of the asynchronous machine 1.

A variation or change in the control vector would not be followed directly by he stator the vector in the intended direction, starting at a stationary position, by only varying one datum value to regulate such control deviation. Both DC current regulators 22a and 22b would have to be operating. This would produce a certain temporary dynamic coupling and, therewith, a reduction of the otherwise possible speed of regulation. A vector perpendicular to the control vector should be added to the control vector provided by the output voltages of the DC current regulators 22a and 22b in order to eliminate such coupling, so that the master vector advances ahead of the initial control vector in the rotational direction of the field.

The value of the additionally superimposed vector, which results in a turning stretching of the control vector, must be proportional, with regard to its value, to the product of the angular velocity of the rotational axis and the value of the stator current and the stray field constants of the asynchronous machine. The aforedescribed turning stretching of the control vector is produced by the embodiment of FIG. 4, by two multipliers 23 and 24. The actual value component voltages $I_w$ and $I_b$ are supplied to input terminals 25 and 26 of the multipliers 23 and 24, respectively. A magnitude corresponding to the angular velocity $\phi$ of the field, provided by an angular velocity measuring component 27, is supplied to another input off each of the multipliers 23 and 24 via an input terminal 28. The angular velocity measuring component 27 has an input terminals 57 and 58 connected to the output terminals 13 and 14, respectively, of the vector analyzer 5.

The output magnitudes of the multipliers 23 and 24 are amplified at a factor T and added at the polarities indicated in FIG. 4 to the outputs of the Dc current regulators 22a and 22b in the adding units 52 and 53. 9 The factor T corresponds to the stray field constants. Basically, it is unimportant at which position, between the outputs of the DC current regulators 22a and 22b and the control inputs of the current inverter 2, the compensating turning stretching of the control vector is effected. At such position, the adding units 52 and 53 are connected. As shown in broken lines, the adding units 52 and 53 for providing the compensating turning stretching of the control vector may be connected between the output terminals 19 and 20 of the component converter 6 and the inputs of the transformation circuit 10.

If the adding units 52 and 53 are connected between the component converter 6 and the transformation circuit 10 as indicated in broken lines at FIG. 4, the corresponding stator related actual component values or magnitudes $I_r$ and $I_j$ of the stator current are the input magnitudes of the multipliers. Analogously, the dynamic coupling between the field axis related magnitudes due to the principal field constant of the asynchronous machine 1 may be compensated for. Since the turning stretching must then be opposite to the rotational direction of the field, the corresponding component voltages of the field vector are supplied to input terminals 25' and 26' of the multipliers 23' and 24', respectively, at negative polarities. This principle of dynamic decoupling by turning stretching of the control vector may obviously be applied for any other retardation, effective between the regulation input of the stator current and the stator current itself. Only the magnitudes are changed, in accordance with the magnitudes of the time constants; that is, the factors or magnitudes at which the output magnitudes of the multipliers are added.

Figure 5:
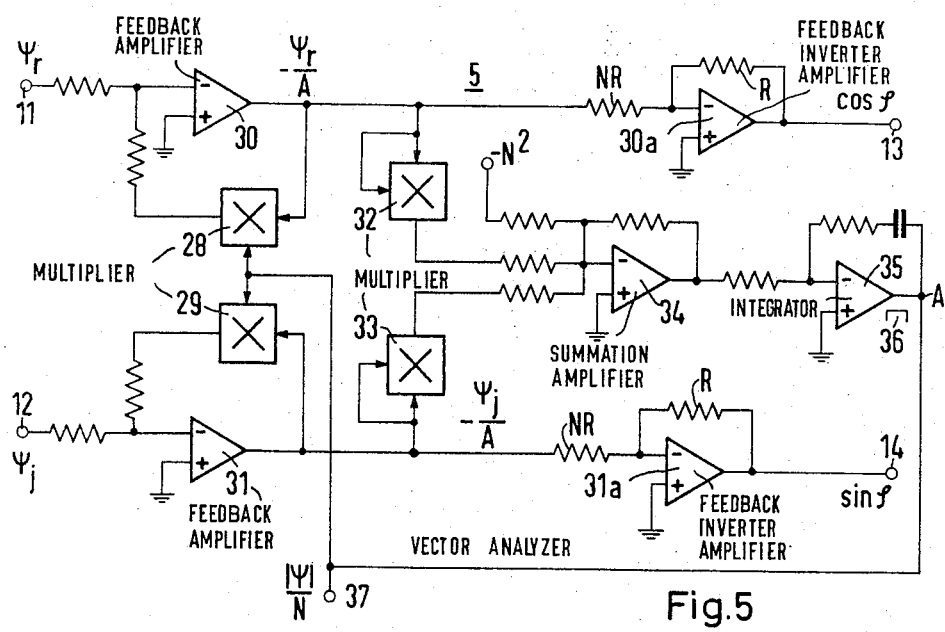
FIG. 5 is a block diagram of a vector analyzer which may be utilized as the vector analyzer of FIGS. 2, 3 and 4.

FIG. 5 illustrates a vector analyzer which may be utilized as the vector analyzer 5 of FIGS. 2, 3 and 4. In FIG. 5, two perpendicular component voltages $\psi_r$ and $\psi_j$ of the rotational field vector are applied to input terminals 11 and 12, respectively. The input terminal 11 is connected to the input of a feedback amplifier 30, the output of which is connected to an input of the multiplier 28. The input terminal 12 is connected to the input of a feedback amplifier 31, the output of which is connected to an input of the multiplier 29. The output voltages of the feedback amplifiers 30 and 31 are squared in two additional multipliers 32 and 33, respectively. Both inputs of the multiplier 32 are connected to the output of the amplifier 30 and both inputs of the multiplier 33 are connected to the output of the amplifier 31.

The output voltages of the amplifiers 30 and 31 are compared with a negative voltage $-N^2$ in a summation or adding amplifier 34, the input of which is connected to the output of each of the additional multipliers 32 and 33. The output voltage of the adding amplifier 34 is supplied to the input of an integrator 35, the output voltage of which is unilaterally limited to zero, by a limiter 36 such as, for example, known limitation diodes. The output voltage of the integrator 35 is applied to, and affects, the other input of each of the multipliers 28 and 29. The output of the multiplier 28 is connected to the input of the amplifier 30 and the output of the multiplier 29 is connected to the input of the amplifier 31.

If the output voltage of the integrator 35 is A, voltages $-\psi_r/A$ are provided at the output of the amplifier 30 and voltages $-\psi_j/A$ are provided at the output of the amplifier 31 due to the feedback effect of the multipliers 28 and 29, respectively. The integrator 35 no longer varies its initial voltage A when its input voltage equals zero. The relationship $$A = (1/N) \sqrt{\psi_r^2 + \psi_j^2} = |\psi/N|$$

is thus valid. A voltage is therefore provided at the output terminal 37 of the vector analyzer which is proportional to the value or magnitude of the vector derived from the component voltages $\psi_r$ and $\psi_j$. If two feedback inverter amplifiers 30a and 31a are added to the outputs of the amplifiers 30 and 31, respectively, as shown in FIG. 5, and said feedback inverter amplifiers 30a and 31a have feedback resistances in the ratio of 1 : N to their input resistances, the components cos $\phi$ and sin $\phi$ of a unit vector are provided at the output terminals 13 and 14 of the vector analyzer. This unit vector always points in the direction of the field vector.

FIG. 6 illustrates a component converter which may be utilized as the component converter 6 of FIGS. 2, 3 and 4, or as the second current converter 21 of FIG. 4. The component converter of FIG. 6 comprises two summation or adding amplifiers 38 and 39 to which the output voltages of four multipliers 40, 41, 42 and 43 are applied. The resistance value of each of the resistors connected to the summation or adding amplifiers 38 and 39 has the same magnitude R. The stator related normalized field component voltages cos $\phi$ and sin $\phi$ are applied to input terminals 15 and 16 of the component converter of FIG. 6. The circuit of FIG. 6 permits the corresponding stator related stator current component $i_r$ and $i_j$ to be derived either from the field axis related magnitudes $b$ and $w$, which are supplied to input terminals 17 and 18 and which correspond to the field axis related stator components $I_w$ and $I_b$, respectively, or, as in the second component converter 21 of FIG. 4, from the normalized stator related field components cos $\phi$ and sin $\phi$ and the stator related current components $I_r$ and $I_j$. This may be demonstrated by the equations derived from FIG. 1, according to $I_r$ and $I_j$ or according to $I_w$ and $I_b$. Such equations are:

$$I_b = I_r/\cos\phi + I_w [tg\phi] \tag{1}$$

$$I_j = I_r [tg\phi] + I_w/\cos\phi \tag{2}$$

FIG. 7 illustrates a transformation circuit which may be utilized as the transformation circuit 10 of FIGS. 3 and 4. The transformation circuit of FIG. 7 converts two perpendicular vector components into corresponding component voltages, that is, components of the three phase system describing the same vector. The transformation circuit of FIG. 7 comprises three summation or adding amplifiers 44, 45 and 46, to which both component voltages $U_r$ and $U_j$ are applied. As shown in FIG. 1, the axis coordinated to the component $U_r$ should coincide with the component $U_R$ of the axis of the three phase system. The conversion is provided by known transformation regulation or control, whereby the resistance values of the circuit resistors of the adding amplifier 44, 45 and 46 have the values indicated in FIG. 7.

FIG. 8 illustrates a transformation circuit which may be utilized as the transformation circuit 8 of FIGS. 3 and 4. The transformation circuit of FIG. 8 transforms a three phase component system $U_R$, $U_S$ and $U_T$ into a two phase perpendicular component system by utilizing two summation or adding amplifiers 47 and 48. The circuit resistors of the adding amplifiers 47 and 48 have the resistance values indicated in FIG. 8.

FIGS. 9 and 10 illustrate the phase shifting effect of delay components and their compensation. FIG. 10 is a circuit diagram of the block diagram of FIG. 9. A delay member or component 49 of the first order of magnitude is connected, for example, in the stator circuit at an arbitrary place between the DC current regulator inputs for the stator current and the stator current itself and is represented as a feedback integrator having an integration time T. The delay time constant of the delay component 49 corresponds to the time T and would represent, for example, the stray field constant of the asynchronous machine 1. It may also correspond to another delay component which is occasionally required for smoothing the actual value of the stator current.

The part of the delay component 49 of the stator which is enclosed by a solid line is first considered. Between the vector input magnitude E and the vector output magnitude A, represented symbolically by two signal flow paths for the vector components describing such vectors, the following vector equation is in effect:

$$E - A = T(dA/dt) \tag{3}$$

Equation (3) indicates that upon a variation in the input vector E by a differential vector $\Delta$E, the initial vector A is varied by a differential vector $\Delta$A which is positioned exactly in the direction of the vector $\Delta$E and which has a value or magnitude which increases with the delay time constant T to the value of the differential vector $\Delta$E. The output vector therefore follows each shift of the input vector E in phase.

If the delay component 49 is considered, however, in a field axis related coordinate system, wherein the angular velocity of the rotational field is $\dot\phi$, the following differential equation occurs between the input magnitudes $E\psi$ and $A\psi$:

$$E\psi - A\psi - j\dot\phi T A\psi = T(dA\psi/dt) \tag{4}$$

In FIG. 9, the foregoing is illustrated by the fact that a fictitious feedback component 50 is connected in the circuit. The feedback component 50 prevents the output $A\psi$ from remaining at the same phase as the input $E\psi$. Furthermore, an error in value or magnitude will occur. This may be compensated in a manner whereby a correction component 51 is connected in the circuit. The correction component 51 has the reverse effect of that of the feedback component 50. The correction component 51 therefore should provide a turning stretching of the input vector, depending upon the output vector, the angular velocity of the rotational field axis $\dot\phi$ and the effective time constant T. Since the effects of the feedback component 50 and the correction component 51 cancel each other out, the relation of Equation (3) is valid between the input vector $\bar{E}\psi$ and the output vector $A\psi$. Thus, when a component such as, for example, $\bar{E}_1$ is shifted perpendicular to the field, the output vector A shifts in the same direction.

In FIG. 10, the delay component 49 of FIG. 9 is, in the direction of the signal flow path, to the right of a broken line I-I. The delay component 49 comprises an RC circuit including equal capacitors $C_1$ and $C_2$ and equal resistors 2R1 and 2R2. The time constant T of the RC circuit corresponds to the product of the capacitance of one of the capacitors and half the resistance of one resistor. A summation or adding amplifier 52 is connected in the signal flow path of the input $\bar{E}_1$ of the delay component 49. A summation or adding amplifier 53 is connected in the signal flow path of the input $\bar{E}_2$ of the delay component 49. Input voltages $\bar{E}_1$ and $\bar{E}_2$ are applied to an input of each of the adding amplifiers 52 and 53, respectively, and indicate the component voltages of a vector. The component directions are perpendicular to each other and the direction of the voltage component $\bar{E}_1$ is shifted by 90° in the direction of the field rotation relative to the direction of the voltage component $\bar{E}_2$. The same applies to the directions of the initial components $A_1$ and $A_2$.

The output magnitude $A_2$ is applied to an input terminal 25 of a multiplier 55 having an output which is subtractively connected to the other input of the adding amplifier 52. The output magnitude $A_1$ is applied to an input terminal 26 of a multiplier 54 having an output which is additively connected to the other input of the adding amplifier 53. The input resistances of the amplifiers 52 and 53, which are connected to the multipliers 54 and 55, are in the ratio 1 : T to the feedback resistances of said amplifiers.

When a voltage proportional to the angular velocity of the rotational axis is applied to the other input of each of the multipliers 54 and 55 via an input terminal 28, a turning stretching of the vector $\bar{E}\psi$ occurs. The input vector $\bar{E}\psi$ is determined by the components $\bar{E}_1$ and $\bar{E}_2$. The turning stretching is dependent upon the output vector, the angular velocity $\phi$ of the rotational axis and the time constant T of the delay component 49.

The compensation provided by the correction component 51 may be basically undertaken at any place in the signal flow path, provided such place is in the direction of the signal flow and is positioned only before the delay component 49. It is unimportant whether or not such compensation is effected in a field axis or in a stator related coordinate system, as hereinbefore described with regard to FIG. 4.

FIG. 11 is a block diagram of an embodiment of an angular velocity measuring circuit which may be utilized as the angular velocity measuring component 27 of FIG. 4. The measuring circuit of FIG. 11 measures the angular velocity of the rotational axis. In FIG. 11, the two normalized perpendicular field component voltages $\cos\phi$ and $\sin\phi$ are applied to input terminals 57 and 58, respectively. The input terminal 57 is connected to the input of the differential component 59 and to an input of a multiplier 62. The input terminal 58 is connected to the input of the differential component 60 and an input of a multiplier 61. The output of the differential component 59 is connected to the other input of the multiplier 61 and the output of the differential component 60 is connected to the other input of the multiplier 62. The output voltages of the multipliers 61 and 62 are subtracted from each other in a summation or adding amplifier 63. In accordance with the differentiation effect, a voltage $\dot{\phi}\sin\phi$ is provided at the output of the differential component 59 and a voltage $\dot{\phi}\cos\phi$ is provided at the output of the differential component 60. The voltage $\dot{\phi}$ is provided at the output terminal 56 and conforms with the angular velocity of the rotational field.

In the embodiments of FIGS. 3 and 4, the perpendicular vector components for the regulation and control are predetermined. FIG. 12 is a block diagram of an embodiment of a vector component regulator in a perpendicular coordinate system in which the regulator vector components are not predetermined by perpendicular components, but in accordance with the value or magnitude and the phase position. The shifting of the vector itself is thereby effected, as hereinbefore described, in definite directions, parallel and perpendicular to the instantaneous rotational field axis. The vector component datum values of the stator current vector are supplied in field axis relation to the component converter 6, as perpendicular regulation magnitudes $I_w^*$ and $I_b^*$, and, as hereinbefore described with relation to FIG. 3, are provided as corresponding vector component datum values $I_r^*$ and $I_j^*$ via the output voltages of the vector analyzer 5.

In the same manner as in FIG. 4, a speed regulator may be superimposed to regulate the speed. The output magnitude of the speed regulator (which speed regulator is not shown in FIG. 12) supplies the component datum value $I_w^*$. The current regulator 2 comprises an intermediate current or circuit inverter 2a, 2b. A current regulator 64 supplies an impressed DC current $I_{gl}$ to the intermediate circuit of the intermediate current inverter. The output of the current regulator 64 is also supplied to the current regulation input of a DC rectifier 2a in a manner whereby a current $I_{gl}$ flows constantly in the DC intermediate circuit. The current $I_{gl}$ has the same magnitude $|I^*|$ as the current supplied to the datum value input of the current regulator 64. The magnitude $|I^*|$ is derived from a second vector analyzer 5' at an output terminal 37 thereof. The second vector analyzer 5' comprises the circuit shown in FIG. 5. The input terminals 11 and 12 of the second vector analyzer 5' are connected to the output terminals 19 and 20, respectively, of the component converter 6. The stator related datum values $I_r^*$ and $I_j^*$ of the components of the control vector are provided at the output terminals 19 and 20 of the component converter 6. The value or magnitude of the control vector is provided at the output terminals 37 of the second vector analyzer 5'.

Analogously to the vector analyzer 5, stator related normalized control component voltages $\cos\beta^*$ and $\sin\beta^*$ are provided at the output terminals 13 and 14, respectively, of the second vector analyzer 5'. The angle $\beta^*$ represents in each case the datum angular position of the stator current vector relative to the stator axis R. The angle $\beta$ corresponds to the actual position of the stator current vector. An angular switching circuit 65 processes information relating to six separate angular positions, for each rotation of the control vector, from the component voltages $\cos\beta^*$ and $\sin\beta^*$, and transforms the information into appropriate control commands for the ignition of the controlled rectifiers or thyristors of an inverter or rectifier 2b. Ignition pulses are provided at output terminals 68 to 73 of the angular switching circuit 65. The ignition pulses control the thyristors of the inverter 2b in a manner whereby the stator current vector follows, in each ase, six individual angular positions of the control vector, described by the component voltages $\cos\beta^*$ and $\sin\beta^*$.

In addition to the control of the phase position of the stator current vector, a phase correction regulator 74 is included in the circuit arrangement of FIG. 12. The phase correction regulator 74 determines any deviation of the stator current vector from the corresponding predetermined six separate angular values and produces a corresponding shifting of the control pulses produced by the angular switching circuit 65. Other possible delays resulting from commutations at the rectifier or inverter control, and other possibilities, may thereby be compensated.

FIGS. 13, 14, 15 and 16 explain the control of the inverter or rectifier circuit of a current regulator having a DC intermediate circuit. FIG. 13 is a circuit diagram of an embodiment of the inverter or rectifier of the current regulator. The rectifier of FIG. 13 comprises six principal control rectifiers or thyristors $S_1$ to $S_6$ in a three phase circuit. Each of the thyristors $S_1$ and $S_6$ is controlled in its conductivity condition by positive ignition pulses supplied to its control electrode. The principal thyristors $S_1$ to $S_6$ have control electrodes $g_1$ to $g_6$, respectively. Six control commutation controlled rectifiers or thyristors $S_7$ to $S_{12}$ have control electrodes $g_7$ to $g_{12}$, respectively. The commutation thyristors $S_7$ to $S_{12}$ are connected parallel to the principal thyristors $S_1$ to $S_6$ via commutation capacitors COC.

When a commutation thyristor $S_7$ to $S_{12}$ is ignited, or switched, to its conductive condition, the principal thyristor connected in parallel with said commutation thyristor is quenched, or switched to its non-conductive condition, in each case. The required commutation voltages are supplied by the commutation capacitor COC, which, with the corresponding stator phase winding of the asynchronous machine 1, forms a resonant or oscillating circuit. In each case, one of the principal thyristors $S_1$ to $S_3$, and, simultaneously, one of the principal thyristors $S_4$ to $S_6$, are controlled in conductivity so that the impressed DC current $I_{gl}$ flows through two phase windings, respectively.

FIG. 14 illustrates the ignition sequence of the individual principal thyristors $S_1$ to $S_6$. FIG. 14 illustrates six different positions of the resultant stator current vector, which occurs, in each case, during the ignition of the individual thyristors, as indicated on the vectors of FIG. 14. In order that the vector moves clockwise in increments of 60° in each case, the principal thyristors $S_1$ and $S_6$ must first be maintained in their conductive condition, then the principal thyrsitors $S_2$ and $S_4$ must be maintained in their conductive condition, and so on. If a continually rotating vector is present, for reasons of symmetry, the angular zones I to VI are available, wherein the principal thyristors are to be ignited, as shown in FIG. 14.

FIG. 15 illustrates an angular switching circuit which may be utilized as the angular switching circuit 65 of FIG. 12. The angular switching circuit of FIG. 15 produces, within the angle zones I to VI of FIG. 14, from the component voltages cos $\beta^*$ and sin $\beta^*$ of the continually rotating control vector, the aforedescribed ignition pulses or the principal and commutation thyristors of the inverter or rectifier 2b of FIG. 13.

In FIG. 15, the component voltages cos $\beta^*$ and sin $\beta^*$ are supplied to input terminals 66 and 67, respectively. The input terminal 66 is connected to an input of each of a plurality of amplifiers 84, 85, 87 and 88. The input terminal 67 is connected to an input of each of a plurality of amplifiers 83, 84, 85, 86, 87 and 88. The input terminal 66 is connected to the negative input of each of the amplifiers 85, 86 and 87 and to the positive input of the amplifiers 83, 84 and 88. The input terminal 67 is connected to the positive input of each of the amplifiers 83, 84 and 88 and to the negative input of each of the amplifiers 85, 86 and 87. The component voltages cos $\beta^*$ and sin $\beta^*$ are applied to the amplifiers 83 and 88 to various extents determined by the resistance values of the circuit resistors of said amplifiers, as indicated in FIG. 15. The amplifiers 83 to 88 thus produce six sinusoidal voltages which are mutually shifted by $\pi/3$. This is indicated by the resistance values shown in FIG. 15.

A critical value indicator 83a has an input connected to the ouput of the amplifier 83. A critical value indicator 84a has an input connected to the output of the amplifier 84. A critical value indicator 85a has an input connected to the output of the amplifier 85. A critical value indicator 86a has an input connected to the output of the amplifier 86. A critical value indicator 87a has an input connected to the output of the amplifier 87. A critical value indicator 88a has an input connected to the output of the amplifier 88. Each of the critical value indicators 83a to 88a may comprise, for example, a known Schmitt trigger circuit. The Schmitt trigger circuit produces a constant positive output signal A when the input signal E is different from zero. The outputs of the critical value indicators 83a to 88a are pulses which are mutually shifted $\pi/3$. Each of the pulses has a duration which corresponds to a half period of the AC voltage applied thereto, or to a half cycle of the control vector.

The pulses produced by the critical value indicators 83a to 88a of the angular switching circuit of FIG. 15 are shown in FIG. 16. The output of the critical value indicator 83a is connected to an input of each of AND gates 89 and 90. The output of the critical value indicator 84a is connected to the other input of the AND gate 90 and to an input of an AND gate 91. The output of the critical value indicator 85a is connected to the other input of the AND gate 91 and to an input of an AND gate 92. The output of the critical value indicator 86a is connected to the other input of the AND gate 92 and to an input of an AND gate 93. The output of the critical value indicator 87a is connected to the other input of the AND gate 93 and to an input of an AND gate 94. The output of the critical value indicator 88a is connected to the other input of the AND gate 89 and to the other input of the AND gate 94.

The critical value indicators 83a, 84a, 85a, 86a, 87a and 88a produce output pulses $PC_1$, $PC_2$, $PC_3$, $PC_4$, $PC_5$ and $PC_6$. Each of the AND gates 89 and 94 provides an output signal at its output when the output signals of both critical value indicators connected thereto differ in value from zero. As shown in FIG. 16, six output pulses are provided at the output terminals 68, 69, 70, 71, 72 and 73 of the angular switching circuit of FIG. 15. The output pulses are mutually shifted by $\pi/3$ and each of said pulses has a duration of $2\pi/3$. The output pulses of the angular switching circuit permit the ignition of the principal and commutation thyristors $S_1$ to $S_{12}$ via the control grids $g_1$ to $g_{12}$, respectively, of said thyristors, as shown in FIG. 14.

FIG. 17 shows a phase correction regulator which may be utilized as the phase correction regulator 74 of FIG. 12. The phase correction regulator of FIG. 17 provides an output at its output terminals 81 and 82 which has an additional shifting effect on the control vector. The normalized component voltages cos $\beta^*$ and sin $\beta^*$ of the continually rotating control vector are applied to the input terminals 75 and 76. The input terminals 75 and 76 are connected to the input terminals 66' and 67' of an additional angular switching circuit 95. The additional angular switching circuit 95 is the same as a part of the angular switching circuit 65 and therefore has similar terminal designations.

Pulse voltages provided at the output terminals 73' and 70' of the additional angular switching circuit 95 are subtracted in a summation or adding amplifier 96. Pulse voltages provided at the output terminals 69' and 72' of the additional angular switching circuit 95 are subtracted in a summation or adding amplifier 97. The curve of the stator phase currents $I_R$ and $I_S$ should then correspond to the curve of the voltates $I_R^*$ and $I_S^*$ which are provided at the outputs of the adding amplifiers 96 and 97, respectively. That is, the phase angle between $I_R^*$ and $I_R$, and between $I_S^*$ and $I_S$ should become zero. The outer vector product of the control vector and the stator current vector is provided by the component voltages $I_R^*$ and $I_S^*$ of the control vector and the component voltages $I_R$ and $I_S$ of the stator current vector. This is accomplished by the utilization of a pair of multipliers 98 and 99 and an adding or summation amplifier 100. The output of the multiplier 98 is coupled to one input of the adding amplifier 100 and the output of the multiplier 99 is coupled to the other input of said adding amplifier. The output of the adding amplifier 100 is connected to an input of a divider 101. A normalized value of the stator vector $|I^*|$ is supplied from the output of the second vector analyzer 5' (FIG. 12) to the other input of the divider 101. The divider 101 produces an output having a magnitude proportional to the sine of the angle between the predetermined control vector and the stator current vector. The magnitude of the output produced by the divider 101 affects the input of an integrator 102.

The integrator 102 has an input coupled to the output of the divider 101 via a multiplier 105, and an output connected in common to an input of each of two multiplier 103 and 104. The input terminal 75 of the phase correction regulator is directly connected to the other input of the multiplier 104. The input terminal 76 of the phase correction regulator is connected to the other input of the multiplier 103 via an inverter amplifier 107. The output magnitudes provided at the output terminals 82 and 81 of the phase correction regulator 74 (FIG. 12) have an additive effect on the inputs 66 and 67 of the angular switching circuit 65. The output voltage of the integrator 102 advances the effective control vector at the input of the angular switching circuit 65 until the input magnitude of said integrator, that is, the angular difference between the control vector and the actual values of the stator current become zero.

FIG. 17 illustrates another possibility for directly evaluating the phase angle between the control vector and the stator current vector. FIG. 17 provides that a phase angle measuring device such as, for example, known from DAS 1,179,634, has its input connected to the output voltage of the amplifier 96 and to the secondary winding of a current vector or transformer which measures the phase current $I_R$. A circuit switch SW, connected in the line between the output of the divider 101 and an input of the multiplier 105, may be moved to its broken line position.

In this modification of the current arrangement of FIG. 17, the output terminals 69' and 72' of the additional angular switching circuit 95, the adding amplifier 97, the multipliers 98 and 99 and the adding amplifier 100 become superfluous. In principle, the operation is fundamentally unchanged. The only difference is that the magnitude applied to the input of the integrator 102 is directly proportional to the phase angle between the control vector and the stator current vector instead of being proportional to the sine of said phase angle.

The multiplier 105 may be utilized to conform the speed of regulation of the integrator 102 to the corresponding angular velocity. The input supplied to the input terminal 80 of the phase correction regulator has a magnitude proportional to the magnitude of the angular velocity of the rotating field.

When the component voltages of the air gap field are superimposed by higher frequency vibrations or harmonics caused, for example, by grooves in the rotor, it is expedient to suppress or eliminate such harmonics. If smoothing, or elimination of such harmonics is undertaken by the customary RC or RL delay components or members, such components will basically cause errors in the phase position and the amplitude of the fundamental wave. For a vector control or regulation wherein a vector is to be exactly measured by two component voltages illustrating the vector, this is not permissible.

A further development of the invention permits in-phase smoothing of the field component voltages when a harmonic-free two phase generator is utilized, which generator has a frequency determined by the output of a PI regulator which is supplied with an input having a magnitude depending upon the difference between the phase angle of an input vector and the phase angle of the vector provided by the two phase generator. The principal purpose is to control the phase angle of a two phase generator, which provides vector component voltages free from harmonics, in a manner whereby its difference from the phase angle of the harmonic-containing vector disappears, on the average, thereby separating and smoothing the fluctuations resulting from the superimposed harmonics.

The two phase generator may comprise two integrators connected in series, thereby eliminating rotating parts, in accordance with another feature of the invention. A multiplier is connected to the input of each of the integrators. A magnitude, depending upon the aforedescribed difference angle, may be provided by known circuitry which operates in an analog or digital manner such as, for example, function indicators or angle measuring devices.

An especially simple structure for providing a magnitude dependent upon the difference angle is provided, in another feature of the invention, by utilizing four multipliers. The vector component voltages and the output voltages of the two phase generator are applied to the inputs of the four multipliers. The output voltages of the multipliers are applied to two adding or summation amplifiers in a manner whereby magnitudes proportional to the sine and cosine of the difference angle are supplied to the inputs. The magnitudes are supplied to a divider to provide a magnitude which is proportional to one of the tangents of the difference angle.

FIG. 18 is a block diagram of an embodiment of a smoothing device which may be applied, for example, to the circuit arrangement of FIG. 2. The same components of FIGS. 2 and 18 are identified by the same reference numerals. The component voltages of the rotor interlinked rotational field vector occur at the output of the correcting units 4a and 4b, and are principally encumbered with harmonics due to grooves in the rotor. The component voltages are supplied to input terminals 108 and 109 of a smoothing component or member G, which is hereinafter described in detail.

The smoothing member G transforms the component voltages in-phase into two harmonic-free stator related vector component voltages which define a unit vector $\psi = e^{j\phi}$, which is always in the direction of the instantaneous rotational axis. The output voltages $\cos \phi$ and $\sin \phi$ of the smoothing component G are applied to the inputs of the component converter 6. The voltages $\cos \phi$ and $\sin \phi$ and the input magnitudes $b$ and $w$, relating to the rotational field axis of the rotor, provide two corresponding stator related vector components for the stator current.

As hereinbefore described with reference to FIG. 6, the component converter 6 comprises four multipliers and two adding or summation amplifiers, and provides at its output terminal 19 a voltage of magnitude $b \cos \phi - w \sin \phi$. The component converter 6 provides at its output terminal 20 a voltage of magnitude $b \sin \phi + w \cos \phi$. The output voltages of the component converter 6 affect the control inputs of the current control unit 2, via the connecting component 7, for example, for the conversion of two axis components to three axis components.

The vector diagram of FIG. 19 explains the principal mode of operation of the smoothing device (FIG. 18). FIG. 19 shows a predetermined planar vector E, which is, for example, a rotational vector, and its phase angle $\epsilon$, in a rectangular stabilized coordinate system having axes $r$ and $j$. The vector components $E_1$ and $E_2$ of the vector E extend in the direction of the coordinate axes $r$ and $j$, respectively.

The vector components $E_1$ and $E_2$ contain harmonics, in addition to the fundamental wave or oscillation. This is represented by vectors in a manner whereby the predetermined rotational vector E is composed of a fundamental wave vector $E_g$ and a harmonic vector $E_o$ which rotates about the point of the vector $E_g$. If the phase angle of the fundamental wave vector $E_g$ is $\epsilon_g$, the difference angle between the phase angle $\epsilon$ of the vector E and the phase angle $\epsilon_g$ of the vector $E_g$ varies periodically between the magnitudes $+\delta_{max}$ and $-\delta_{max}$, so that its average or median value is zero. In other words, each vector A having a phase angle $\alpha$, whose phase angle difference $\epsilon - \alpha$ relative to the phase angle of the predetermined vector E is eliminated on the average, would always extend in the direction of the fundamental wave vector $E_g$. This is true, independently of the value and angular velocity of the predetermined vector E and independently of the value and angular velocity of the harmonic vector $E_o$, that is, the ordinal number of the corresponding harmonic, and is also true when a plurality of harmonics are simultaneously present.

FIG. 20 is a circuit diagram of the smoothing device of the invention which may be utilized as the smoothing component G of FIG. 18. The smoothing component of FIG. 20 comprises a two phase generator 114 of known type, which is free from harmonics and provides output voltages $\sin \alpha$ and $\cos \alpha$. The phase angle $\alpha$ of the vector magnitude produced by the two phase generator is thus proportional to the time interval of the input magnitude $\dot\alpha$ supplied to an input terminal 128 of said two phase generator. The input terminal 128 of the two phase generator 114 is connected to the output of a PI regulator 115.

The output signal of the PI regulator 115 thus determines the angular velocity of the vector magnitude produced by the two phase generator and the frequency of the output voltages which represent the vectors. Sine and cosine voltages are provided at output terminals 111 and 110 of the two phase generator 114 and define a unit vector, having a value 1, at a phase angle $\alpha$. The component voltage of the unit vector and the component voltages $E_1$ and $E_2$ of the vector $\epsilon = |E|e^{j\epsilon}$ to be smoothed are supplied to a vector multiplier 116.

The vector multiplier 116 has the same structure as the component converter 6, so that two voltages are provided at output terminals 117 and 118 of said vector multiplier. The output voltages of the vector multiplier are proportional to the magnitude $|E|$ of the input vector E and to the sine and cosine of the difference angle $\epsilon - \alpha$. The output terminal 118 of the vector multiplier 116 is coupled to the divisor input of a divider 119 and the output terminal 117 of said vector multiplier is connected to the dividend input of said divider.

The divider 119 produces an output voltage which is proportional only to the tangent of the difference angle $\epsilon - \alpha$. A diode 120 is connected between the output terminal 118 of the vector multiplier 116 and the divisor input of the divider 119. The diode 120 provides an unequivocal correlation between the input and output voltages of the divider 119, within the range of the difference angle $\epsilon - \alpha$, between $-\pi$ and $+\pi$. The magnitude of the output voltage of the divider 119 is proportional at positive values of the voltage appearing at the output terminal 118 to the tangent of the difference angle $\epsilon - \alpha$. Otherwise, the output voltage of the divider 119 has a maximal value determined by the structure thereof, and a polarity which coincides with that of the sinusoidal function of the difference angle $\epsilon - \alpha$.

The operation of the circuit arrangement of FIG. 20 is as follows: The PI regulator 115 tends, in its usual manner, to bring about a stable condition, by varying its output magnitude $\dot\alpha$ and thereby varying the phase angle of the two phase generator 114. This stable condition is reached when the input magnitude of the PI regulator 115 is eliminated, on the average. The input magnitude of the PI regulator 115 then varies periodically between zero and magnitudes $\pm tg\, \delta_{max}$. The output magnitude of the PI regulator varies correspondingly, and may be dampened, as desired, when its proportional amplification is sufficiently low and its reset time is sufficiently long.

The attenuation of the variations caused by harmonics is provided in a manner whereby an integral connection is provided between the input magnitude of the two phase generator 114 and the phase angle magnitude represented by both output voltages of said two phase generator. In this manner, the vector described by the output voltages at the output terminals 110 and 111 of the two phase generator 114 then rotates very slightly, relative to its phase position, about the position of the fundamental wave vector $E_g$. Thus, the unit vector described by the output voltages at the output terminals 110 and 111 of the two phase generator 114 points practically in the direction of the fundamental wave vector $E_g$.

In this equalized or stable condition, the voltage $|E| \cos(\epsilon - \alpha)$ at the output terminal 118 of the vector multiplier 116 always represents the projection of the input vector E upon the fundamental wave $E_g$. The magnitude of the projection of the input vector E upon the fundamental wave vector $E_g$ varies periodically about the magnitude of said fundamental wave vector. A delay component of the second order of magnitude comprises an integrator 122. The integrator 122 produces an output signal which is connected in feedback relation to the output of a PI amplifier 121. The integrator 122 provides sufficient smoothing of the voltage at the output terminal 118 of the vector multiplier 116, which varies about the magnitude of the fundamental wave vector during the equalized or stable condition of the PI regulator 115. A voltage is thus provided at the output 123 of the integrator 122 which corresponds exactly to the magnitude of the fundamental wave vector $E_g$.

It is expedient that the characteristics of the PI amplifier 121 and the integrator 122 conform to the characteristics of the corresponding PI regulator 115 and the corresponding two phase generator 114, so that the corresponding signal flow paths or circuits have the same transfer characteristics. The output terminal 123 of the integrator 122 is connected to an input of each of a pair of multipliers 124 and 125. The output terminal 110 of the two phase generator 114 is connected to the other input of the multiplier 124. The output terminal 111 of the two phase generator 114 is connected to the other input of the multiplier 125. A voltage A1 is provided at the output of the multiplier 124 and at an output terminal 126 connected thereto. A voltage A2 is provided at the output of the multiplier 125 and at an output terminal 127 connected thereto. The output terminals 126 and 127 are thus output terminals of the smoothing device of FIG. 20. The output voltages A1 and A2 correspond to the rectangular components of the fundamental wave vector $E_g$, which is thus correctly illustrated, relative to its phase and amplitude.

FIG. 21 is a circuit diagram of the circuit arrangement of FIG. 20. The same components of FIGS. 20 and 21 are identified by the same reference numerals. The component voltages $E1 = |E| \cos \epsilon$ and $E2 = |E| \sin \epsilon$ are applied to the input terminals 108 and 109 of FIG. 21. The component voltage E1 applied to the input terminal 108 is applied to an input of each of a pair of multipliers 130 and 131. The component voltage E2 applied to the input terminal 109 is applied to an input of each of a second pair of multipliers 132 and 133. The output terminal 110 of the two phase generator 114 is connected to an input of the multiplier 124 and the other input of each of the multipliers 130 and 132. The output terminal 111 of the two phase generator 114 is connected to an input of the multiplier 125 and the other input of each of the multipliers 131 and 133. The output of the multiplier 130 and the output of the multiplier 133 are supplied to the positive input of a summation or adding amplifier 134 via resistors having a resistance value R in an additive manner. The output of the multiplier 131 is supplied to the positive input of a summation or adding amplifier 135 and the output of the multiplier 132 is supplied to the negative input of said adding amplifier. The outputs of multipliers 131 and 132 are thus supplied to the inputs of the adding amplifier 135 via resistors having a resistance value R in a subtractive manner. Each of the adding amplifiers 134 and 135 is in feedback connection with a resistor having a resistance value R and the sum of the conductance values connected to the positive and negative inputs is always equal.

The divider 119 comprises an amplifier in feedback connection via a multiplier 136 which, in its inoperative condition, provides a very strong idling amplification. The input of the divider 119 is connected to an output terminal 117 of the adding amplifier 135. The negative input of the divider 119 thus represents the dividend input and the output multiplier 136 represents the divisor input of said divider. An output terminal 118 of the adding amplifier 136 is coupled to an input of the multiplier 136 via a diode 120. The cathode of the diode 120 is connected to the input of the multiplier 136. The output signal of the divider 119 is supplied to the input of the PI regulator 115. The PI regulator 115 is an amplifier having an RC component feedback circuit. The output signal of the PI regulator 115 is supplied to the frequency regulating input 128 of the two phase generator 114.

As hereinbefore described, the diode 120 permits only the positive values of the voltage at the output terminal 118 of the adding amplifier 134 to be applied to the multiplier 136. The voltage at the output terminal 118 of the adding amplifier 134 is applied to the input of the PI amplifier 121 and thence to the input of the integrator 122. The output of the integrator 122 is connected in feedback, via an inverter amplifier 137, to the input of the PI amplifier 121. The integrator 122 and the PI amplifier 121 are also capacitive or ohmic-capacitive feedback amplifiers. The output signal at the output terminals 123 of the integrator 122 is applied to the other input of each of the multipliers 124 and 125.

As hereinbefore described, the other input of each of the multipliers 124 and 125 is connected to the output terminals 110 and 111, respectively, of the two phase generator 114. In order to reduce the number of amplifier components, the adding amplifier 135 may be combined with the divider 119 in a manner whereby the output voltages of the multipliers 131 and 132 are subtracted from each other in the input circuit of the amplifier of said divider rather than, as illustrated, in a special amplifier. This modification is preferred in cases wherein easy accessibility to the voltage $|E| \sin (\epsilon - \alpha)$ is not of primary importance.

In the circuit of FIG. 21, a pair of conduit switches 138 and 139 are provided in series between the output of the PI regulator 115 and the input of the two phase generator 114. When the circuit switches 138 and 139 are moved to their position shown by broken lines, an additional signal path or circuit for the output signal of the divider 119 is provided parallel to the signal path or circuit via the PI regulator 115, and includes a pair of Zener diodes 140a and 140b connected with opposite polarities. The disruptive voltages of the Zener diodes 140a and 140b are rated in a manner whereby said Zener diodes become conductive at an output voltage of the divider 119 which corresponds to an angle difference $\epsilon - \alpha$ of about $\pi/2$. An amplification of the output magnitude of a summation or adding amplifier 141 thus occurs and the regulation magnitude applied to the two phase generator 114, and therefore the change of the phase angle of said two phase generator is varied to the median or average position of the input vector E at considerably greater speed than would be possible if only the regulator 115 were effective.

The progressive supply, at increased angle differences, of the frequency regulation input to the two phase generator 114, guarantees that the vector of said two phase generator does not lose contact with the input vector E, thereby preventing slippage even when greater frequency changes are required. The aforedescribed modification is applicable to the example of FIG. 1, wherein considerable frequency variations may occur during operation.

If a magnitude is available which corresponds at least approximately to the angular velocity of the input vector or to the frequency of its component voltages, in the embodiment of FIG. 18, this would constitute, for example, the rotor speed of the asynchronous machine 1, a further acceleration of the phase angle follow-up reference could be provided by supplying such magnitude to an input terminal 142, thus additionally feeding the frequency regulation input terminal 128 of the two phase generator 114. The input terminal 142 is resistively coupled to the series connected Zener diodes 140a and 140b.

FIG. 2 illustrates an embodiment of a two phase generator which may be utilized as the two phase generator 114 of FIGS. 20 and 21. The two phase generator 114 of FIG. 22 operates statically. In FIG. 22, two integrators 143 and 144 are connected in series with two multipliers 145 and 146 in the order 145, 143, 146, 144. The output signal of the integrator 144 is fed back to an input of the multiplier 145. The output of the multiplier 145 is connected to the input of the integrator 143. The output of the integrator 143 is connected to an input of the multiplier 146. The output of the multiplier 146 is connected to an input of the integrator 144.

When a signal $\dot{\alpha} = d\alpha/dt$ is supplied to the input terminal 128 of the two phase generator 114, said signal is applied to the other input of each of the multipliers 145 and 146. A voltage proportional to sin $\alpha$ is then provided at the output of the integrator 143 and a voltage proportional to cos $\alpha$ is provided at the output of the integrator 144. The voltages provided at the output terminals 110 and 111 are proportional to the cosine of the time integral of the voltage applied to the input terminal 128.

In order to maintain constant the amplitudes of the cosine and sine at the output terminals 110 and 11, the integrator 114 is provided with a gain attenuating feedback comprising a feedback resistor 147. The feedback resistor 147 energizes the oscillatory or resonant circuit comprising the two integrators 143 and 144 to produce oscillations which increase in amplitude.

A pair of diodes 148 and 149 are connected in opposite polarity to tap points of a potentiometer 150. The potentiometer 150 is symmetrically supplied from both ends thereof. The potentiometer 150 has a center tap which is connected to the output of the integrator 144. As soon as the magnitude of the oscillations reaches the threshold values of the diodes 148 and 149, a feedback becomes effective which limits the voltage amplitude to the grid potential of said diodes, so that the amplitude stabilization of the output voltages at the output terminals 110 and 111 is attained.

The circuitry utilized in each of the blocks of the drawings is well known in the art. Each of these blocks constitutes an analog computer building block, which is known in the art and which is commercially available. Thus, for example, the multiplier 23', 24', 28, 29, 32, 33, 40, 41, 42, ,43, 54, 55, 61, 62, 98, 99, 103, 104, 105, 124, 125, ,130, 131, ,132, 133 and 136 is the multiplier described on page 55, section II.32, of the "Application Manual for Computing Amplifiers for Modelling Measuring Manipulating & Much Else" by Philbrick Researches, Inc., 1966. The multiplier is also shown on pages 92 and 93 of Analogrechnen, or Analog Computation, by Giloi and Lauber, Springer-Verlag 1963. The multiplier is available as building block Q3M1P, manufactured by Philbrick/Nexus Research of Dedham, Mass.

The divider 101 and 119 is described on page 55, section II.33 of the aforedescribed "Application Manual for Computing Amplifiers for Modelling Measuring Manipulating & Much Else." The divider is available as building block Q3M1P.

The integrator amplifier 35, 122, 143 and 144 is described on page 44, section II.11 of the aforedescribed "Application Manual for Computing Amplifiers for Modelling Measuring Manipulating & Much Else." The integrator amplifier is known as an augmenting integrator and is an amplifier having PI-behavior, which is a proportional positive reset control action.

The inverter shown in block 2 is specifically disclosed in FIGS. 13 and 14 and in "Controlled Rectifier Manual," First Edition, 1960, pages 104 and 105, FIGS. 7.18 and 7.19B. The proportional components and summation units 4a and 4b are disclosed in FIG. 3. The vector analyzer 5 is disclosed in FIG. 5. The component converter 6 and 21 is disclosed in FIG. 6. The regulators 9a, 9b, 22a, 22b, 110, 64 and 115 are disclosed in "Siemens Zeitschrift," 1965, pages 862 to 864, particularly page 863. The transformation circuits 8 and 10 are disclosed in FIGS. 7 and 8, the angular velocity measuring component 27 is disclosed in FIG. 11. The differential component 59 and 60 is disclosed in the publication "Elektronik," 1966, No. 7, work sheet No. 6, Position 19. The angular switching circuit 65 is disclosed in FIG. 15. The critical value indicator 83a and 88a is disclosed in Siemens Zeitschrift, 1964, pages 807–811. The phase correction regulator 74 is disclosed in FIG. 17. The integrators 102, 122 and 147 are disclosed in the publication "Elektronik," 1966, No. 7, work sheet No. 6, Position 14 and in "Application Manual for Computing Amplifiers . . . . ," page 44, section II.10. The smoothing member G is disclosed in FIG. 20. The vector multiplier 116 corresponds to the component converter and disclosed in FIG. 6.

Advantageous applications of the smoothing device of the invention include not only the hereinbefore described vector component control of the rotary field machine, but include the use of the smoothing device when it is desired to obtain the fundamental wave, with correct phases and amplitudes, in a multiphase voltage system having harmonics therein. Each multiphase system describes a vector and may therefore be represented by the components of a two phase system which then provides the input magnitudes of the fundamental wave smoothing device of the invention. It is therefore of special importance that the fundamental wave smoothing device operate according to its desired function at each fundamental wave frequency, including zero frequency.

The smoothing device may also be utilized, in accordance with the invention, for the synchronization of power systems, in order to obtain a harmonic-free and in-phase image of the actual magnitude of the power supply voltage or of the power supply voltage vector. The invention may also be utilized with the same advantage for smoothing the synchronization voltage of control units for phase controlled rectifiers. Since the synchronization voltage is customarily derived from the power supply voltage, in-phase suppression of the harmonics is also important in such case, in order to guarantee the same ignition times during each half wave.

The invention provides, during the operation of an asynchronous machine, rapid and decoupled adjustability of magnitudes producing the torque at least as well and as simple as has been provided with DC machines drives. When a DC machine is replaced by an asynchronous machine, considerable advantages may be obtained, including increased operational safety and elimination of the need for maintenance of the asynchronous machine.

While the invention has been described by means of specific examples and in specific embodiments, I do not

I claim:

1. Apparatus for field-axis related control of the stator current of an inverter-fed asynchronous machine, comprising a component converter having two adding amplifiers each having two inputs and four multipliers each having two inputs and an output, each output of the multipliers being connected to a corresponding input of the amplifiers, a first input terminal connected to an input of each of two of said multipliers for applying a stator related field component voltage $\cos \phi$ thereto, a second input terminal connected to an input of each of the other two of said multipliers for applying a stator related field component voltage $\sin \phi$ thereto, a third input terminal connected to the other input of each of two of said multipliers for applying a field axis related voltage $b$ or a stator related component voltage $I_r$ thereto, and a fourth input terminal connected to the other input of each of the other two of said multipliers for applying a field axis related voltage $w$ or a stator related component voltage $I_j$ thereto.

2. Apparatus as claimed in claim 1, further comprising a vector analyzer having a pair of inputs and a pair of outputs connected to the first and second input terminals of said component converter, said vector analyzer having two amplifiers each having an input and an output and two multipliers, each of the amplifiers having a feedback circuit which includes a corresponding one of the multipliers, a first input terminal connected to the input of one of the amplifiers for applying a stator related field component $\psi_r$ thereto, a second input terminal connected to the input of the other of the amplifiers for applying a stator related field component $\psi_j$ thereto, two additional multipliers each having an output and an input connected to the output of a corresponding one of the amplifiers for squaring the output voltage of the corresponding amplifier, and an integrator having an input coupled to the outputs of the additional multipliers and an output connected to an input of each of said two multipliers for adding the squared output voltages of the amplifiers and comparing the resultant sum with a constant magnitude.

3. Apparatus as claimed in claim 2, wherein one side of the output of the integrator of the vector analyzer is limited to zero.

4. Apparatus as claimed in claim 2, further comprising an angular velocity measuring component having a pair of inputs connected to the outputs of said vector analyzer and an output coupled to inputs of said component converter, said angular velocity measuring component having a pair of differential components each having an input and an output, a pair of multipliers each having an input connected to the output of a corresponding one of the differential components, another input and an output, a first input terminal connected to the input of one of the differential components and to the other input of the multiplier connected to the other differential component for applying a stator related field component voltage $\cos \phi$ thereto, a second input terminal connected to the input of the other of the differential components and to the other input of the multiplier connected to the other differential component for applying a stator related field component voltage $\sin \phi$ thereto, a summation amplifier having an output and a pair of inputs each coupled to the output of a corresponding one of the multipliers for subtractively combining the outputs of said multipliers, and an output terminal connected to the output of the summation amplifier.

5. Apparatus as claimed in claim 2, further comprising an additional vector analyzer having outputs and a pair of inputs connected to outputs of said component converter, said additional vector analyzer producing output component voltages $\cos \beta^*$ and $\sin \beta^*$ at two of its outputs, a current regulator having a datum value input connected to a third output of said additional vector analyzer for an intermediate DC current $I_{gl}$, an inverter having control means, and an angular switching circuit having inputs coupled to the two of the outputs of the additional vector analyzer and outputs connected to the control means of the inverter.

6. Apparatus as claimed in claim 5, wherein said angular switching circuit comprises a plurality of amplifiers having outputs and inputs connected to outputs of the additional vector analyzer for producing a plurality of AC voltages shifted by 60° relative to each other, a plurality of critical value indicators each having an input connected to the output of a corresponding one of said amplifiers and a plurality of AND gates each having two inputs connected to the outputs of corresponding ones of said critical value indicators and an output connected to the control means of the inverter.

7. Apparatus as claimed in claim 5, further comprising a phase correction regulator having inputs connected to the outputs of the additional vector analyzer and outputs connected to the inputs of the angular switching circuit for connecting the angular position of the stator current vector.

8. Apparatus as claimed in claim 7, wherein said phase correction regulator comprises an integrator having an input and an output, input means for applying to the input of the integrator a magnitude dependent upon the angular difference between a control vector determined by the component voltage $\cos \beta^*$ and $\sin \beta^*$ at the outputs of the additional vector analyzer and the stator current vector, and phase rotating means for rotating the control vector which is supplied to the input of the angular switching circuit, said phase rotating means having an input connected to the output of the integrator, other inputs and outputs, said phase rotating means comprising a pair of multipliers each having a pair of inputs and an output and an inverter amplifier having an input connected to an input of said phase correction regulator and an output connected to an input of one of the multipliers, an input of each of the multipliers being connected to the output of the integrator.

9. Apparatus as claimed in claim 8, wherein said phase correction regulator further comprises an additional pair of multipliers each having a pair of inputs and an output, an input terminal connected to an input of one of the additional multipliers multipliers for applying a voltage $I_S$ proportional to the stator phase current, thereto, an input terminal connected to an input of the other of the additional multipliers for applying a voltage $I_R$ proportional to the stator phase current, means coupling the inputs of the phase correction regulator to the other input of each of the additional multipliers for applying thereto AC voltages $I_R^*$ and $I_S^*$ formed from the component voltage $\cos \beta^*$ and $\sin \beta^*$ of the control vector, and a summation amplifier having a pair of inputs each connected to an output of a corresponding one of the additional multipliers and an output coupled to the input of the integrator, the output voltages of the additional multipliers being subtractively supplied to the summation amplifiers.

10. Apparatus as claimed in claim 8, wherein the phase correction regulator further comprises a phase angle measuring circuit having an output coupled to the input of the integrator and a pair of inputs, an input terminal connected to an input of the phase angle measuring circuit for applying a voltage $I_R$ proportional to the stator phase current thereto, and an input terminal connected to the other input of the phase angle measuring circuit for applying an AC voltage $I_R{}^*$ derived from the component voltages cos $\beta^*$ and sin $\beta^*$ of the control vector thereto.

11. Apparatus as claimed in claim 9, wherein the phase correction regulator further comprises a third additional multiplier having an input coupled to the output of the summation amplifier, an output connected to the input of the integrator and another input, and an input terminal connection to the other input of the third additional multiplier for supplying a magnitude $\dot{\phi}$ proportional to the angular velocity of the field thereto.

12. Apparatus for field-axis related control of the stator current of an inverter-fed asynchronous machine, comprising a harmonic-free two-phase generator for in-phase smoothing of field component voltages, said generator having an input and a pair of outputs, a PI regulator having an input and an output connected to the input of said generator for controlling the frequency of said generator, and input means connected to the input of the PI regulator for applying thereto a magnitude dependent upon the difference between the phase angle $\epsilon$ of an input vector E and the phase angle $\alpha$ of a vector produced by said generator.

13. Apparatus as claimed in claim 12, wherein one input of the divider is the divisor input and the other input of the divider is the dividend input and only positive magnitudes of the summation amplifier output voltage are applied to the divisor input of said divider.

14. Apparatus as claimed in claim 13, further comprising a pair of Zener diodes connected in series in opposing polarities between the output of the divider and the input of said generator.

15. Apparatus as claimed in claim 13, further comprising means coupled to the input of said generator for providing a magnitude dependent upon the angular velocity of the vector E for increasing the disturbance quantity of said generator.

16. Apparatus as claimed in claim 13, further comprising a pair of additional multipliers each having a pair of inputs and an output, smoothing means coupling the output of the summation amplifier applied to the divisor input of the divider to an input of each of the additional multipliers, an output of said generator being connected to the other input of one of the additional multipliers and the other output of said generator being connected to the other input of the other of the additional multipliers.

17. Apparatus as claimed in claim 16, wherein said apparatus is adapted to synchronize a power supply.

18. Apparatus as claimed in claim 16, wherein said apparatus is adapted to smooth the synchronizing voltage of control units for phase angle controlled rectifiers.

19. Apparatus for field-axis related control of the stator current of an inverter-fed asynchronous machine, comprising a harmonic-free two phase generator for inphase smoothing of field component voltages, said generator having an input and a pair of outputs, a PI regulator having an input and an output connected to the input of said generator for controlling the frequency of said generator, and input means connected to the input of the PI regulator for applying thereto a magnitude dependent upon the difference between the phase angle of an input vector and the phase angle of a vector produced by said generator, said generator comprising two integrators and two multipliers connected in series circuit arrangement with one of said multipliers connected to the input of said generator, followed by one of said integrators, the other of said multipliers and the other of said integrators.

20. Apparatus for field-axis related control of the stator current of an inverter-fed asynchronous machine, comprising a harmonic-free two phase generator for inphase smoothing of field component voltages, said generator having an input and a pair of outputs, a PI regulator having an input and an output connected to the input of said generator for controlling the frequency of said generator, input means connected to the input of the PI regulator for applying thereto a magnitude dependent upon the difference between the phase angle of an input vector and the phase angle of a vector produced by said generator, four multipliers each having two inputs and an output, one output of said generator being connected to an input of each of two of said multipliers and the other output of said generator being connected to an input of each of the other two of said multipliers, an input terminal connected to the other input of each of two of said multipliers for applying a vector component voltage thereto, an input terminal connected to the other input of each of the other two of said multipliers for applying a vector component voltage thereto, a pair of summation amplifiers each having a pair of inputs coupled to the outputs of corresponding ones of said multipliers and an output for producing output magnitudes proportional to the sine and cosine of a differential angle, and a divider having a pair of inputs each coupled to the output of a corresponding one of said summation amplifiers and an output for producing a magnitude proportional to the tangent of said differential angle.

21. Apparatus for field-axis related control of the stator current of an inverter-fed asynchronous machine, comprising a component converter (6) having a first pair of input terminals and a second pair of input terminals, voltage means connected to the first pair of input terminals for providing two DC voltages ($b$, $w$ or $I^*_w$, $I^*_b$) determining two field axis related components of the stator current vector of the machine of which one is oriented in parallel and the other is oriented perpendicularly to the instantaneous rotary field axis of the machine, the component converter converting the field axis related components into corresponding stator related components of a datum value vector for the stator current, and field transmitting means connected to the second pair of input terminals for providing two component voltages (sin $\phi$, cos $\phi$) defining the instantaneous portion of the rotary field axis.

22. Apparatus as claimed in claim 21, further comprising a second component converter (21) having a first pair of input terminals, a second pair of input terminals and a pair of output terminals, transformation means connected to the first pair of input terminals for providing two component voltages ($I_r$, $I_j$) of the stator current vector, the field transmitting means being connected to the second pair of input terminals, and a pair of current regulators having pilot value inputs connected to the output terminals of the second component converter and outputs connected to the first pair of input terminals of the first component converter (6).

23. Apparatus as claimed in claim 22, wherein the voltage means comprises a speed regulator (110) providing an output signal which determines one of the field axis related stator current components ($w$ or $I^*_w$).

24. Apparatus as claimed in claim 23, further comprising an angular velocity measuring component (27) having an output and a pair of multipliers (23, 24) having first inputs connected to the output (56) of the angular velocity measuring component and second inputs connected to the output terminals of the second component converter (21) and supplied by the second component converter with currents ($I_w$, $I_b$) proportional to the components of the stator current, and a pair of adding amplifiers connected to the multipliers for adding the output voltages of the multipliers to the component voltages of the datum value vector in a manner whereby a turning stretching of the datum value vector is effected in the rotary direction of the field of the machine and in dependence upon the stray field-time constant of the machine.

25. Apparatus as claimed in claim 24, further comprising a source of voltages ($\psi_r$, $\psi_j$), an additional pair of multipliers (23', 24') having first inputs connected to the output (56) of the angular velocity measuring component (27) and second inputs connected to the source of voltages, and outputs, and an additional pair of adding amplifiers connected to the outputs of the additional multipliers for adding the output voltages of the additional multipliers to the component voltages of the datum value vector in a manner whereby a turning stretching of the datum value vector is effected in opposition to the rotary direction of the field of the machine and in dependence upon the main fieldtime constant of the machine.

* * * * *